US011334226B2

(12) United States Patent
Yokoyama et al.

(10) Patent No.: US 11,334,226 B2
(45) Date of Patent: May 17, 2022

(54) INFORMATION PROCESSING DEVICE, INFORMATION PROCESSING METHOD, AND PROGRAM

(71) Applicant: SONY CORPORATION, Tokyo (JP)

(72) Inventors: Ryo Yokoyama, Tokyo (JP); Osamu Ito, Tokyo (JP); Ikuo Yamano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/969,695

(22) PCT Filed: Dec. 11, 2018

(86) PCT No.: PCT/JP2018/045563
§ 371 (c)(1),
(2) Date: Aug. 13, 2020

(87) PCT Pub. No.: WO2019/163260
PCT Pub. Date: Aug. 29, 2019

(65) Prior Publication Data
US 2021/0004132 A1 Jan. 7, 2021

(30) Foreign Application Priority Data
Feb. 20, 2018 (JP) .............................. JP2018-027689

(51) Int. Cl.
G06F 3/0484 (2022.01)
G06F 3/01 (2006.01)

(52) U.S. Cl.
CPC ............ G06F 3/0484 (2013.01); G06F 3/016 (2013.01)

(58) Field of Classification Search
CPC .............................. G06F 3/0484; G06F 3/016

USPC ........................................................ 715/771
See application file for complete search history.

(56) References Cited

U.S. PATENT DOCUMENTS

| 9,797,729 | B1 * | 10/2017 | Lee ......................... A61H 3/061 |
| 2010/0164894 | A1 | 7/2010 | Kim et al. |
| 2011/0248837 | A1 * | 10/2011 | Israr ......................... G06F 3/016 340/407.1 |
| 2012/0223882 | A1 * | 9/2012 | Galor ...................... G06F 3/011 345/157 |
| 2014/0070957 | A1 * | 3/2014 | Longinotti-Buitoni ...................... G06F 3/011 340/870.01 |

(Continued)

FOREIGN PATENT DOCUMENTS

WO WO 2018/008217 A1 1/2018

Primary Examiner — Tadesse Hailu
(74) Attorney, Agent, or Firm — Paratus Law Group, PLLC

(57) ABSTRACT

There is provided an information processing device to provide an information processing device, an information processing method, and a program that enable performing intuitive operations in regard to setting the sensory position of tactile stimulation. The information processing device includes a display control unit that displays information related to a tactile presentation device and displays a user-specified sensory position in the tactile presentation device; and a generating unit that, according to the sensory position and according to the positions of a plurality of tactile stimulation units disposed in the tactile presentation device, generates an output control signal to be output to the plurality of tactile stimulation units, so that tactile stimulation is sensed at the sensory position.

17 Claims, 19 Drawing Sheets

SMALL AMOUNT OF PRESSING:
SMALL DIMENSIONS

LARGE AMOUNT OF PRESSING:
LARGE DIMENSIONS

(56) References Cited

U.S. PATENT DOCUMENTS

| | | | |
|---|---|---|---|
| 2015/0130706 A1* | 5/2015 | Lacroix | A63F 13/54 345/156 |
| 2016/0067743 A1 | 3/2016 | Tanaka et al. | |
| 2016/0129279 A1* | 5/2016 | Ferolito | A61N 5/0616 607/89 |
| 2016/0291694 A1* | 10/2016 | Israr | G06T 13/00 |
| 2017/0087458 A1* | 3/2017 | Nakagawa | A63F 13/25 |
| 2017/0098350 A1* | 4/2017 | Ebeling | G10H 1/0066 |
| 2017/0325039 A1* | 11/2017 | Khwaja | H04R 29/00 |
| 2018/0036531 A1* | 2/2018 | Schwarz | A61N 1/0484 |
| 2018/0303702 A1* | 10/2018 | Novi | A61H 3/061 |
| 2019/0196596 A1* | 6/2019 | Yokoyama | A63F 13/25 |

* cited by examiner

FIG.19
- SETTING MOVEMENT PATH OF SENSORY POSITION WHILE POINTING WITH LASER POINTER
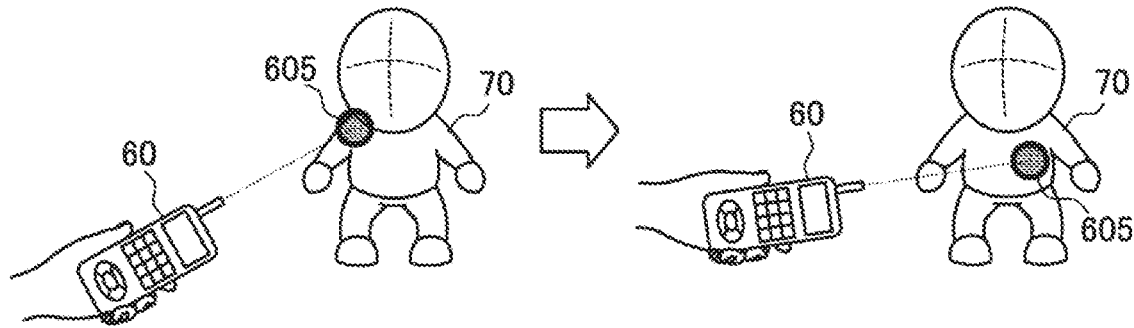
- EXPRESSING INTENSITY OF TACTILE PRESENTATION USING CONCENTRATION OF ILLUMINATION OF LASER POINTER
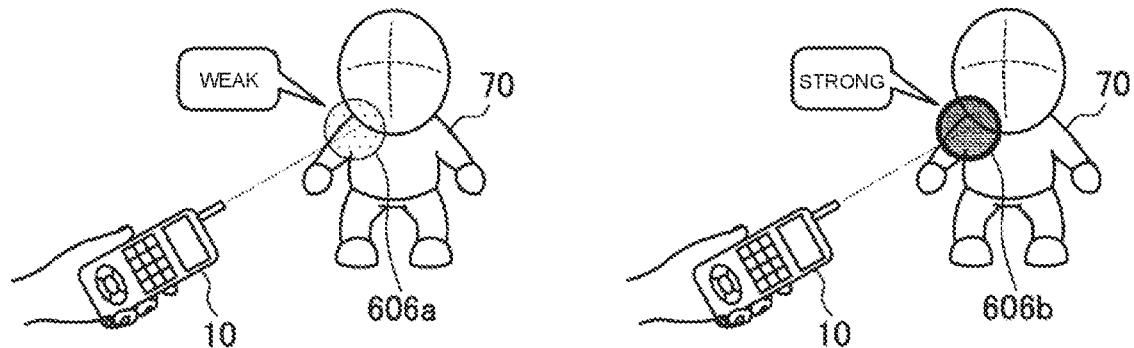
- EXPRESSING RANGE OF TACTILE PRESENTATION USING SIZE OF LASER POINTER
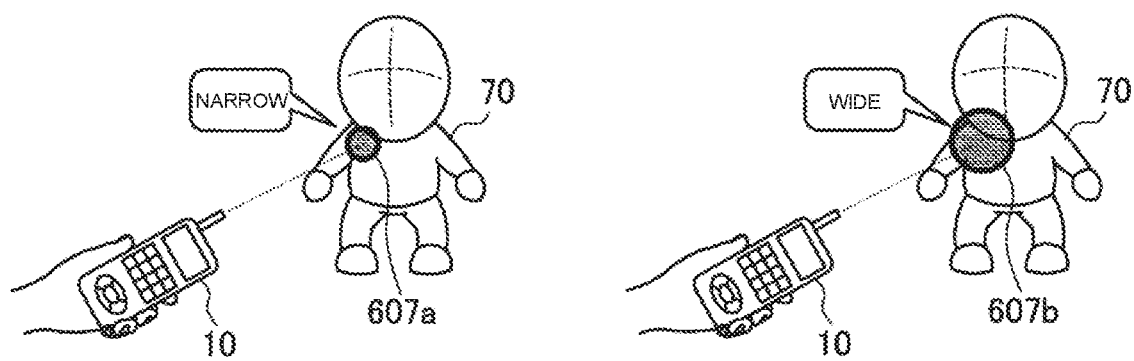

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2018/045563 (filed on Dec. 11, 2018) under 35 U.S.C. § 371, which claims priority to Japanese Patent Application No. 2018-027689 (filed on Feb. 20, 2018), which are all hereby incorporated by reference in their entirety.

FIELD

The application concerned is related to an information processing device, an information processing method, and a program.

BACKGROUND

Conventionally, for example, various technologies have been proposed for offering tactile stimulation, such as vibrations, to the user.

In Patent Literature 1 mentioned below, a technology is disclosed that, in response to the occurrence of an event in a virtual space, makes a predetermined device output tactile stimulation.

CITATION LIST

Patent Literature

Patent Literature 1: JP 2015-166890 A

SUMMARY

Technical Problem

Depending on the target position at which tactile stimulation is to be offered, it is sometimes desirable that a different amount of tactile stimulation is output. However, in the technology disclosed in Patent Literature 1, regardless of the position information, the exactly same amount of tactile stimulation is output.

Moreover, the only way to confirm the effect of tactile presentation is to check the waveforms of the signals output to each tactile presentation device. Hence, the actual effect of tactile presentation is difficult to understand.

In that regard, in the application concerned, an information processing device, an information processing method, and a program are proposed that enable performing intuitive operations in regard to setting the sensory position of tactile stimulation.

Solution to Problem

According to the present disclosure, an information processing device is provided that includes: a display control unit that displays information related to a tactile presentation device and displays a sensory position in the tactile presentation device as specified by a user; and a generating unit that, according to the sensory position and according to positions of a plurality of tactile stimulation units disposed in the tactile presentation device, generates an output control signal to be output to the plurality of tactile stimulation units, so that tactile stimulation is sensed at the sensory position.

According to the present disclosure, an information processing method implemented in a processor is provided that includes: displaying information related to a tactile presentation device, and a sensory position in the tactile presentation device as specified by a user; and generating, according to the sensory position and according to positions of a plurality of tactile stimulation units disposed in the tactile presentation device, an output control signal to be output to the plurality of tactile stimulation units, so that tactile stimulation is sensed at the sensory position.

According to the present disclosure, a program is provided that causes a computer to function as: a display control unit that displays information related to a tactile presentation device and displays a sensory position in the tactile presentation device as specified by a user; and a generating unit that, according to the sensory position and according to positions of a plurality of tactile stimulation units disposed in the tactile presentation device, generates an output control signal to be output to the plurality of tactile stimulation units, so that tactile stimulation is sensed at the sensory position.

Advantageous Effects of Invention

As described above, according to the application concerned, it becomes possible to perform intuitive operations in regard to setting the sensory position of tactile stimulation.

The abovementioned effect is not necessarily limited in scope and, in place of or in addition to the abovementioned effect, any other effect indicated in the present written description or any other effect that may occur from the present written description can also be achieved.

BRIEF DESCRIPTION OF DRAWINGS

FIG. 19 is a diagram for explaining about a variety of ways of setting the sensory effect using a doll according to the present embodiment.

DESCRIPTION OF EMBODIMENTS

Figure 1:
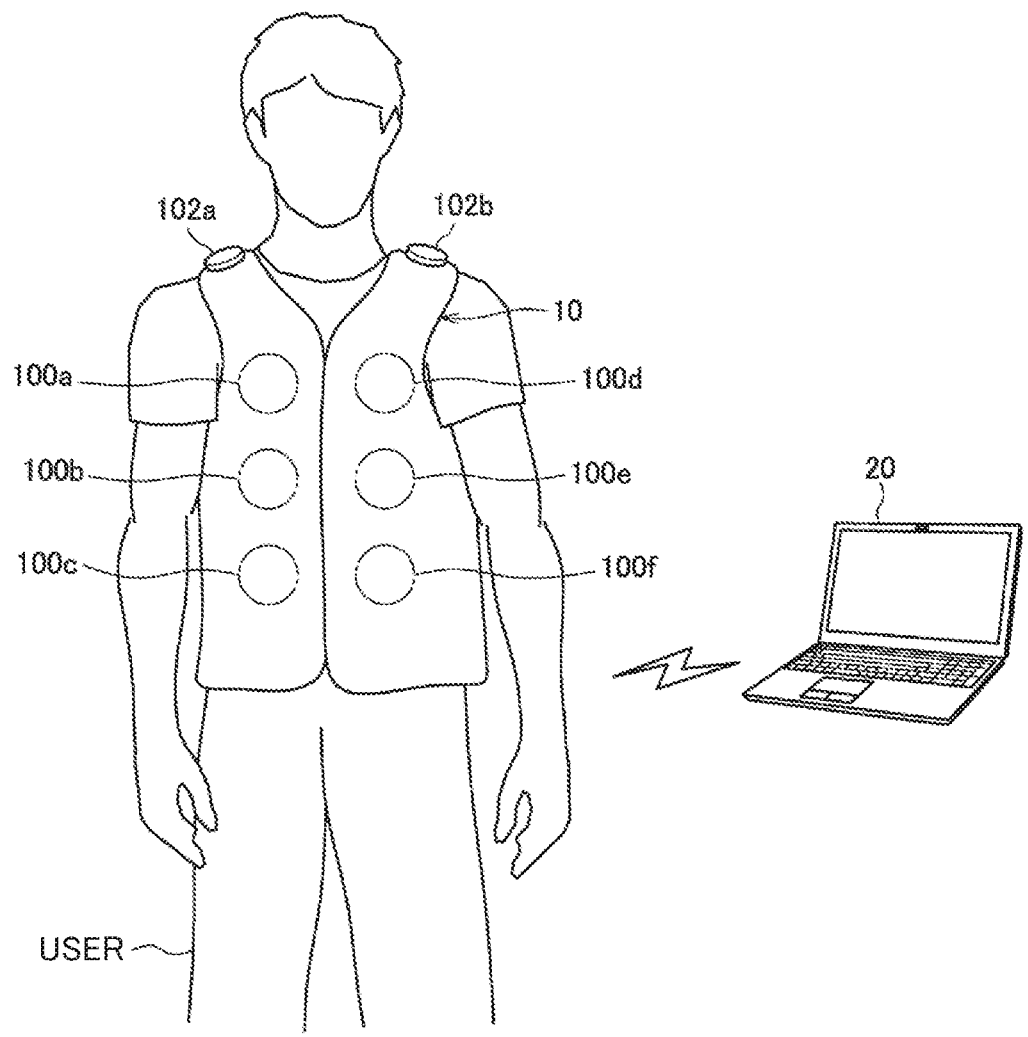
FIG. 1 is a diagram for explaining the overview of an information processing system according to an embodiment of the application concerned.

A preferred embodiment of the application concerned is described below in detail with reference to the accompanying drawings. In the present written description and the drawings, the constituent elements having practically identical functional configuration are referred to by the same reference numerals, and the explanation is not given repeatedly.

The explanation is given in the following sequence.
1. Overview of information processing system according to embodiment of application concerned
2. Configuration
2-1. Configuration of information processing device
2-2. Configuration of tactile presentation device
3. Examples of setting screen for sensory effect
4. Operations
5. Tactile pointer
6. Summary <<1. Overview of Information Processing System According to Embodiment of Application Concerned>>

FIG. 1 is a diagram for explaining the overview of an information processing system according to the embodiment of the application concerned. As illustrated in FIG. 1, the information processing system according to the embodiment of the application concerned includes a tactile presentation device 10 that offers tactile stimulation to a user, and includes an information processing device 20 that performs the output setting of tactile stimulation.

There is no particular restriction on the shape of the tactile presentation device 10, and examples of the shape include a vest style device that fits on the user. The tactile presentation device 10 illustrated in FIG. 1 includes a plurality of tactile stimulation units 100 (also called actuators) and two sound output units 102. For example, in the tactile presentation device 10, a predetermined number of (for example, six) tactile stimulation units 100 can be disposed on the front side as well as on the back side of the user. As an example, the individual tactile stimulation units 100 are disposed to have such a positional relationship that each tactile stimulation unit 100 disposed on the front side is positioned opposite to one tactile stimulation unit 100 disposed on the back side.

In FIG. 1 is illustrated an example in which the tactile presentation device 10 is of the vest style (sleeveless clothing). However, that is not the only possible case, and the tactile presentation device 10 can alternatively have sleeves. In that case, in addition to having the tactile stimulation units 100 disposed in the chest region and the abdominal region of the user, one or more tactile stimulation units 100 can also be disposed at the positions corresponding to both arms of the user. Moreover, the tactile presentation device 10 is not limited to be an outerwear as illustrated in FIG. 1; and alternatively can be pants or socks, shoes, a belt, a cap, gloves, or a mask. Furthermore, in the tactile presentation device 10 illustrated in FIG. 1, the sound output units 102 are disposed in the left and right shoulder portions. However, the present working example is not limited to that case. Alternatively, there can be only one sound output unit 102, or there can be three or more sound output units 102. Still alternatively, instead of including the sound output units 102 in the tactile presentation device 10, they can be disposed in the concerned predetermined space as independent devices or can be included in some other wearable device (such as headphones or a headset) other than the tactile presentation device 10, or can be included in a portable device (such as a portable music player, a smartphone, or a portable gaming device).

Moreover, the tactile presentation device 10 is not limited to be a clothing accessory as illustrated in the example, and examples thereof can also include a controller, a gun-type controller, a bed, and a chair.

(Tactile Stimulation Unit 100)

In the case in which the tactile stimulation units 100 included in the tactile presentation device 10 independently generate vibrations, the generated vibrations can be sensed only in the surrounding area of each tactile stimulation unit 100. Thus, if the tactile stimulation units 100 are disposed distantly from each other, the vibrations that are separately generated by each tactile stimulation unit 100 can be discretely sensed in the body of the user.

Meanwhile, a sensory illusion called phantom sensation has been medically elucidated. The phantom sensation represents a sensory illusion in which, when stimulation is offered simultaneously to different positions on the skin, the person senses only singular stimulation among the stimulated positions. For example, if two tactile stimulation units 100 that are disposed on the body of the user are made to output stimulation at the same time, then it is known that, usually, the position of stimulation as sensed by the user (hereinafter, called the sensory position) is in between the two tactile stimulation units 100.

Meanwhile, varying the output intensity of the tactile stimulation units 100, the range of tactile stimulation that can be offered by the tactile stimulation units 100 can be continuously expanded without varying the placement distance among the individual tactile stimulation units 100. For example, the explanation is given about an example of the relationship between the output intensity and the sensory position of two tactile stimulation units 100. For example, assume that, as time advances, the output intensity of the first tactile stimulation unit 100 is continuously weakened as, for example, "1", "0.6", and "0"; and that the output intensity of the second tactile stimulation unit 100 is continuously strengthened as, for example, "0", "0.6", and "1". In that case, the sensory position (as sensed by the user) can continuously move from the contact position of the first tactile stimulation unit 100 to the contact position of the second tactile stimulation unit 100.

(Background)

Figure 2:
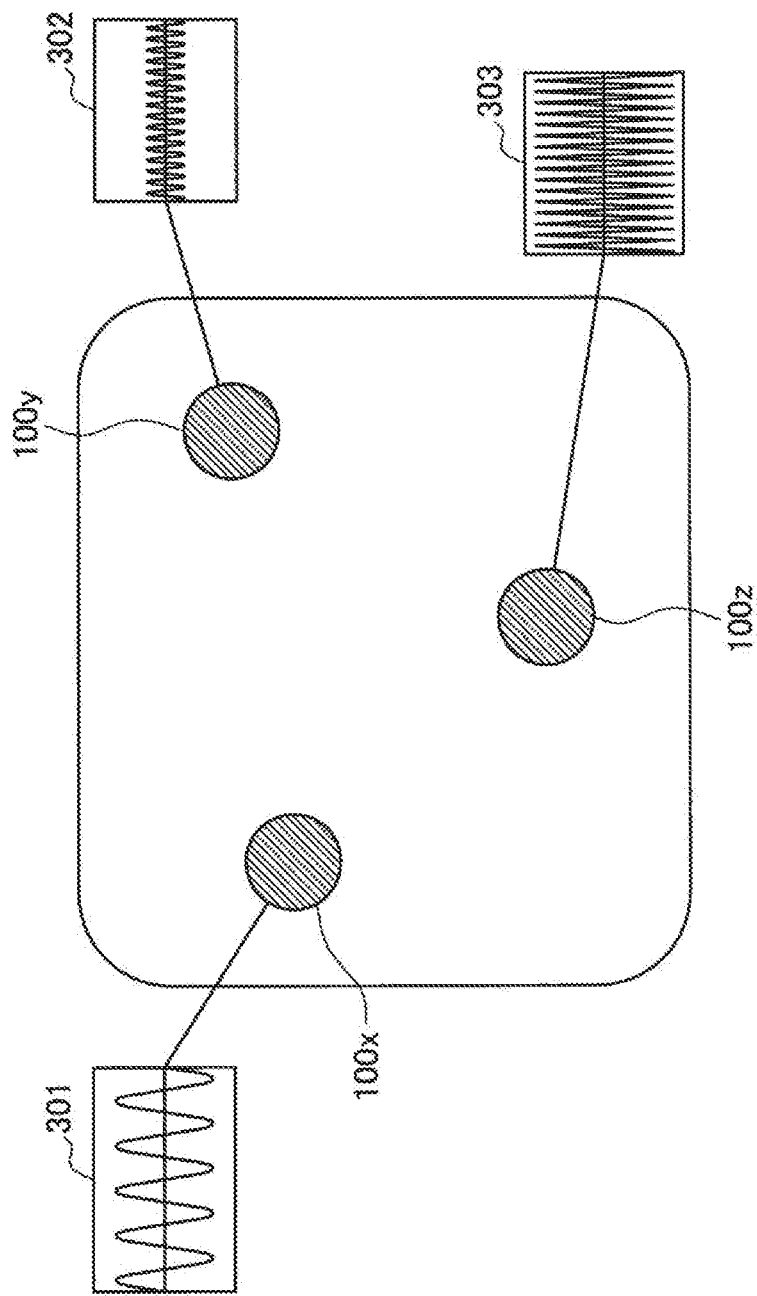
FIG. 2 is a diagram illustrating an exemplary case in which the tactile sense output from each tactile stimulation unit is displayed as a waveform.

At the time of designing tactile signals of various tactile presentation devices, it is desirable that intuitive operations are performed. However, even if the tactile stimulation offered by each tactile stimulation unit 100 (actuator) is displayed as a waveform (a tactile signal) as illustrated in FIG. 2, the actual sensory effect (i.e., which body part feels in what way) is not clear.

In that regard, in the present embodiment, a GUI is used to enable specification of the sensory position and the sensory intensity; and, based on the specified sensory position and the specified sensory intensity, the output signals to the corresponding tactile stimulation units are auto-generated. As a result, the user becomes able to perform intuitive operations in regard to setting the sensory position of tactile stimulation.

Figure 3:
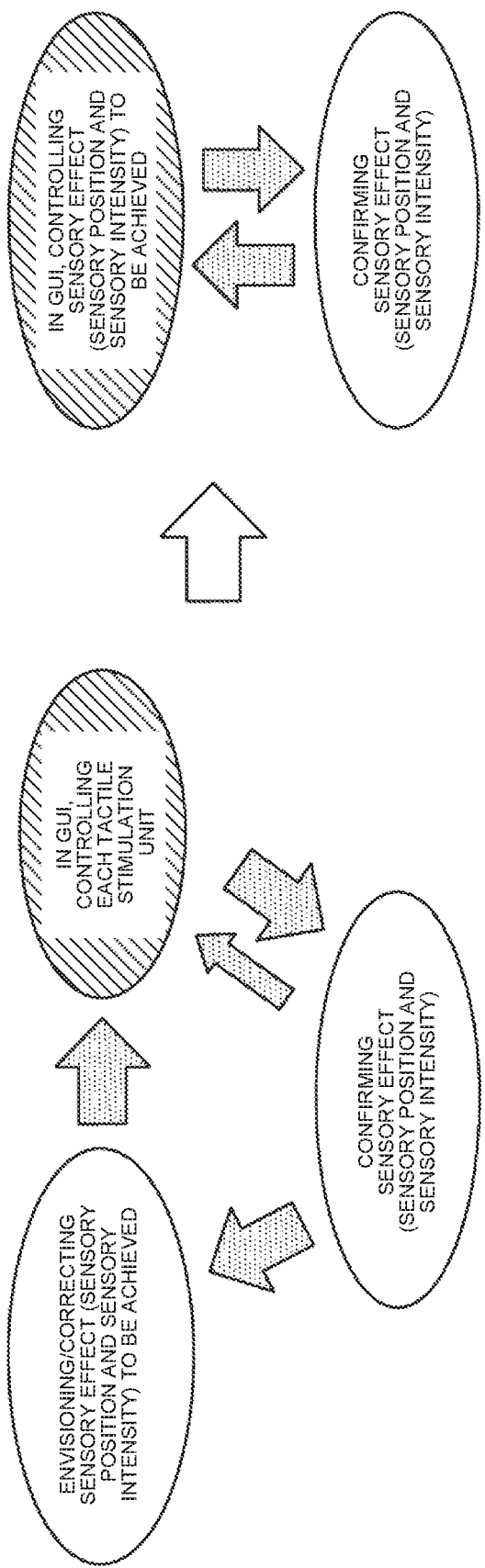
FIG. 3 is a diagram for explaining about reduction in the number of processes achieved in sensory effect designing according to the present embodiment.

Moreover, according to the present embodiment, it becomes possible to reduce the number of processes in the sensory effect designing. More particularly, for example, as illustrated in the left-side portion in FIG. 3, usually, the following three steps need to be performed in a repeated manner: upon envisioning the sensory effect (the sensory position and the sensory intensity) to be achieved, controlling the output of each tactile stimulation unit; confirming (feeling) the sensory effect; and again envisioning/correcting, using the GUI, the sensory effect to be achieved, performing output control, and actually feeling the sensory effect. In contrast, according to the present embodiment, as illustrated in the right-side portion in FIG. 3, the sensory effect designing can be intuitively performed by repeatedly performing two steps, namely, controlling, using the GUI, the sensory effect to by achieved (i.e., specifying the sensory position and the sensory intensity); and confirming (feeling) the sensory effect. The sensory effect (i.e., the sensory position and the sensory intensity) can be specified by performing a mouse operation or a touch operation in the GUI, or can be specified using a controller such as a 3D pointer; and the output of the tactile presentation device 10 changes in such a way that the concerned sensory effect is offered. In this way, by specifying the actual feeling (i.e., specifying how much intensity at which position), it becomes possible to eliminate the user control of the individual tactile stimulation units 100 and to achieve automation.

<<2. Configuration>>

Figure 4:
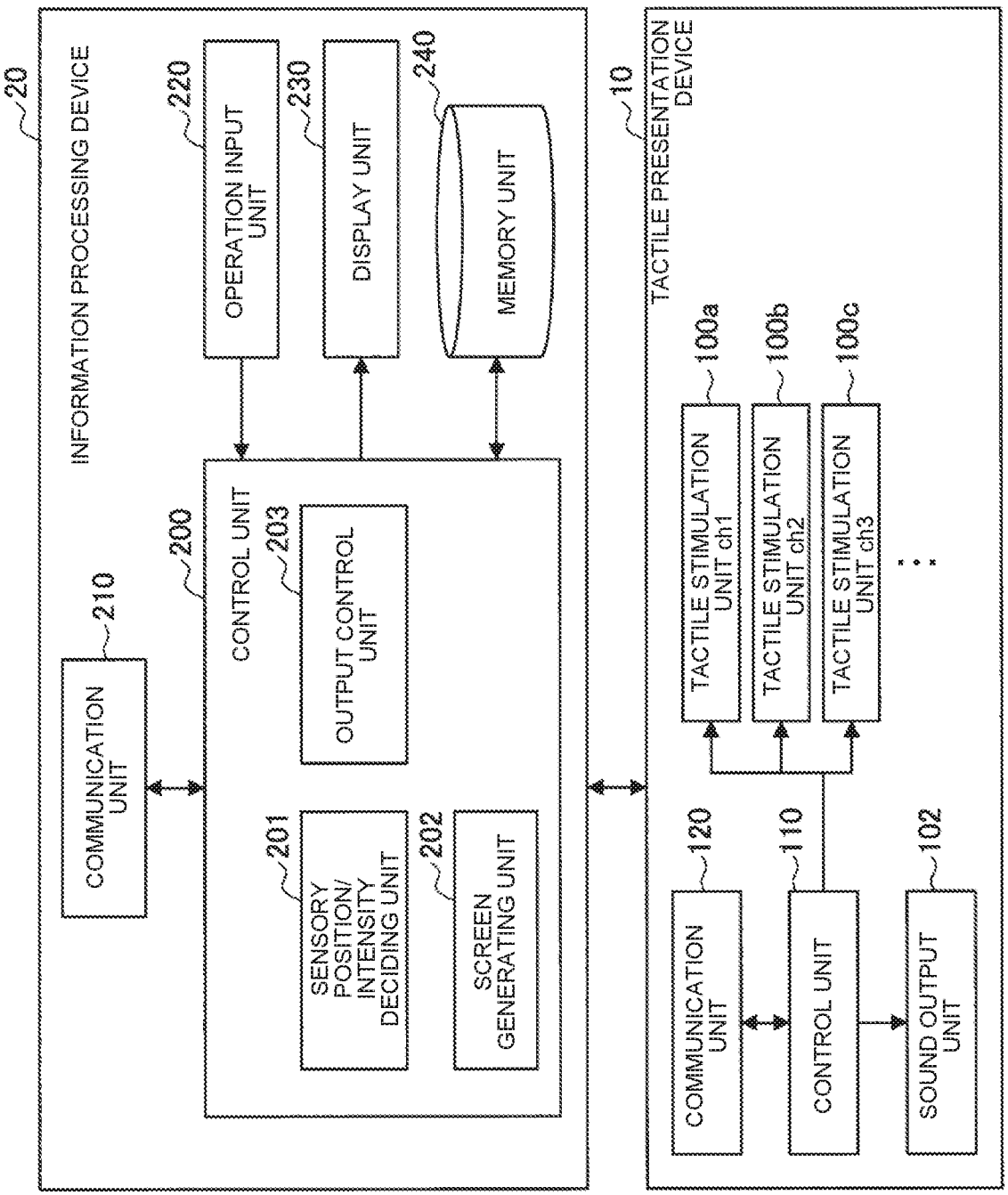
FIG. 4 is a block diagram illustrating an exemplary configuration of the information processing device and an exemplary configuration of a tactile presentation device according to the present embodiment.

Explained below with reference to FIG. 4 is the specific explanation of a configuration of the information processing device 20 and a configuration of the tactile presentation device 10 according to the present embodiment.

<2-1. Configuration of Information Processing Device 20>

With reference to FIG. 4, the information processing device 20 according to the present embodiment includes a control unit 200, a communication unit 210, an operation input unit 220, a display unit 230, and a memory unit 240.

(Control Unit 200)

The control unit 200 functions as an arithmetic processing device and a control device, and controls the overall operations in the information processing device 20 according to various programs. The control unit 200 is implemented using, for example, an electronic circuit such as a CPU (Central Processing Unit) or a microprocessor. Moreover, the control unit 200 can include a ROM (Read Only Memory) that is used to store programs and operation parameters to be used, and a RAM (Random Access Memory) that is used to temporarily store parameters that undergo changes.

Furthermore, the control unit 200 according to the present embodiment can also function as a sensory position/intensity deciding unit 201, a screen generating unit 202, and an output control unit 203.

Sensory Position/Intensity Deciding Unit 201

The sensory position/intensity deciding unit 201 functions as a generating unit that, according to the specified sensory position and the specified sensory intensity, decides on (calculates) the vibrational intensity with respect to the tactile stimulation units 100 corresponding to the target sensory position (in such a way that the specified sensory intensity is sensed at the specified sensory position); and generates output control signals to be output to the tactile stimulation units 100. Herein, the specified sensory position also includes the movement path of the sensory position.

The sensory position and the movement path thereof can be set on the surface of the body of the user. For example, tactile stimulation can be offered to the user in such a way that the sensory position moves, in a continuous manner, from the position representing the start point on the body of the user to the position representing the end point. Alternatively, the movement path of the sensory position can also be set as a path joining a first side of the body of the user, the inside of the body of the user, and a second side that is on the opposite side of the first side. Herein, the first side can be the front side of the user, and the second side can be the back side of the user. Alternatively, for example, the first side can be the surface of the visible side of a predetermined part such as an arm, and the second side can be the underside of that part. For example, when the movement path is a path joining a position on the front side of the user, the inside of the body of the user, and a position on the back side of the user; then it becomes possible to offer, to the user, a piercing sensation through the body from the front side to the back side.

Meanwhile, the sensory position/intensity deciding unit 201 can also set the sensory range.

Moreover, the sensory position/intensity deciding unit 201 can also associate the sensory position to the timing corresponding to the contents being reproduced (such as a movie or gaming contents). As a result, using the tactile presentation device 10, predetermined tactile stimulation can be applied at predetermined timings to the user who is watching the contents.

Firstly, the sensory position/intensity deciding unit 201 identifies a plurality of (for example, three) tactile stimulation units 100 positioned in the neighborhood of the specified sensory position. Then, based on the positional relationship of each tactile stimulation unit 100 with the specified sensory position and based on the specified sensory intensity, the sensory position/intensity deciding unit 201 decides on the output intensity of each tactile stimulation unit 100. That is, based on the specified sensory position, the specified sensory intensity, and the distances to the tactile stimulation units 100 disposed in the neighborhood; the sensory position/intensity deciding unit 201 adjusts the output intensity of the tactile stimulation units 100 (i.e., generates an output control signal to be output to each tactile stimulation unit 100). Regarding the adjustment of the output intensity of the tactile stimulation units 100 for the purpose of offering predetermined tactile stimulation to the target position on the body of the user, the technology disclosed in PCT/JP2017/14379 is used.

For example, when a first tactile stimulation unit 100 and a second tactile stimulation unit 100 are positioned in the neighborhood of the specified sensory position, the sensory position/intensity deciding unit 201 decides on the output intensity of the first tactile stimulation unit 100 based on the distance from the contact position of the first tactile stimulation unit 100 on the body of the user to the target sensory position. Similarly, the sensory position/intensity deciding unit 201 decides on the output intensity of the second tactile stimulation unit 100 based on the distance from the contact position of the second tactile stimulation unit 100 on the body of the user to the target sensory position.

Given below is the more detailed explanation about the abovementioned function. Firstly, the explanation is given about an example of adjusting the output intensity of two tactile stimulation units 100 which are so positioned that the target sensory position is present in between the contact positions of the two tactile stimulation units 100. For example, based on the positional relationship of the target sensory position with the intermediate position of the contact positions of the first tactile stimulation unit 100 and the second tactile stimulation unit 100, the sensory position/intensity deciding unit 201 decides on the output intensity of the first tactile stimulation unit 100 and the output intensity of the second tactile stimulation unit 100.

For example, the sensory position/intensity deciding unit 201 can decide the output intensity of the first tactile stimulation unit 100 and the output intensity of the second tactile stimulation unit 100 in such a way that the total value of the output intensity of the first tactile stimulation unit 100 and the output intensity of the second tactile stimulation unit 100 increases in inverse proportion to the distance between the intermediate position and the target sensory position. Alternatively, if the target sensory position is closer to the contact position of the first tactile stimulation unit 100 than to the contact position of the second tactile stimulation unit 100, then the sensory position/intensity deciding unit 201 can decide the output intensity of the first tactile stimulation unit 100 in such a way that the output intensity of the first tactile stimulation unit 100 increases in proportion to the distance between the contact position of the first tactile stimulation unit 100 and the target sensory position. The same is the case regarding the second tactile stimulation unit 100 too (i.e., the converse relation also holds true).

At the same time, based on the positional relationship between the intermediate position and the target sensory position, the sensory position/intensity deciding unit 201 varies the ratio of the output intensity of the first tactile stimulation unit 100 and the output intensity of the second tactile stimulation unit 100.

Screen Generating Unit 202

The screen generating unit 202 can generate a setting screen for setting the target sensory position and the target sensory intensity. In the setting screen, as the information related to the tactile presentation device 10, an image indicating the positions of the tactile stimulation units 100 in the tactile presentation device 10 is displayed, and an image indicating the outside shape of the tactile presentation device 10 is displayed. Thus, the user can specify the position for tactile stimulation (the sensory position) using the images. Moreover, the user can be allowed to freely set the positions of the tactile stimulation units 100 in a virtual manner. Furthermore, if the positions of the tactile stimulation units 100 are set in advance and already known, an image indicating the positions of the tactile stimulation units 100 is displayed. Moreover, although the positions of the tactile stimulation units 100 are set in advance and already known, if the setting is done not to present the positions to the user (for example, if the positions of the tactile stimulation units 100 represent a trade secret), an image indicating only the outside shape of the tactile presentation device 10 can be displayed. Meanwhile, in the setting screen, it is possible to input the movement path of the sensory position. Moreover, it is also possible to set a plurality of sensory positions (the movement paths of a plurality of sensory positions). Furthermore, it is also possible to set the sensory position and the sensory intensity in such a way that tactile stimulation is generated at a predetermined position at a predetermined timing corresponding to the reproduction of predetermined contents. In the setting screen, the sensory position and the sensory intensity can be specified by performing a mouse operation or a touch operation, or can be specified using a controller such as a 3D pointer. Regarding specific examples of the setting screen according to the present embodiment, the explanation is given later with reference to FIGS. 5 to 11.

Meanwhile, the screen generating unit 202 can also generate a screen for displaying the output control signals (waveforms) that is generated by the sensory position/intensity deciding unit 201 and are output to the tactile stimulation units 100.

Output Control Unit 203

The output control unit 203 performs output control of tactile stimulation with respect to the tactile presentation device 10 according to the decision taken by the sensory position/intensity deciding unit 201. As a result, for example, when the user actually wears and feels the tactile presentation device 10, he or she becomes able to confirm the effect of the specified tactile stimulation (the sensory effect). More particularly, the output control unit 203 outputs the generated output control signals (controls the generation of vibrations) to a plurality of predetermined tactile stimulation units 100 decided by the sensory position/intensity deciding unit 201. Moreover, the output control unit 203 can perform the reproduction control of the contents (videos) reproduced in a display device (a display, an HMD, a projector, a PC, or a smartphone); and, according to the reproduction of the contents, can perform the output control of tactile stimulation from the tactile presentation device 10 at a predetermined timing. Furthermore, the output control unit 203 can also perform control for reproducing a sound, such as an impact sound with respect to the offered tactile stimulation, from the sound output unit 102 of the tactile presentation device 10. Moreover, the output control unit 203 can also perform control to display, in the display unit 230, various screens generated by the screen generating unit 202.

(Communication Unit 210)

The communication unit 210 sends information to and receives information from other devices. For example, under the control of the output control unit 203, the communication unit 210 sends control signals for the output of tactile stimulation to each tactile stimulation unit 100 (or to the tactile presentation device 10). Moreover, under the control of the output control unit 203, the communication unit 210 sends control signals for the display of the target images for reproduction to a display device (not illustrated), and sends control signals for the output of target sounds for reproduction to each sound output unit 102 (or to the tactile presentation device 10).

The communication unit 210 establishes communicable connection with other devices using, for example, a wired/wireless LAN (Local Area Network), Wi-Fi (registered trademark), Bluetooth (registered trademark), near field wireless communication, a mobile communication network (LTE (Long Term Evolution)), or 3G (3rd generation cellular communication method).

(Operation Input Unit 220)

The operation input unit 220 receives an operation instruction from the user, and outputs the operation details to the control unit 200. The operation input unit 220 can be a touch sensor, a pressure sensor, or a proximity sensor. Alternatively, the operation input unit 220 can have a physical configuration such as a keyboard, a mouse, a button, a switch, and a lever.

(Display Unit 230)

The display unit 230 is a display device that outputs a setting screen for enabling setting of the sensory effect. Examples of the display unit 230 include a display device such as a liquid crystal display (LCD) or an organic EL (Electro Luminescence) display.

(Memory Unit 240)

The memory unit 240 is implemented using a ROM (Read Only Memory) that is used to store programs and operation parameters to be used in the operations of the control unit 200, and a RAM (Random Access Memory) that is used to temporarily store parameters that undergo changes.

Till now, the specific explanation was given about a configuration of the information processing device 20 according to the present embodiment. However, the configuration of the information processing device 20 is not limited to the example illustrated in FIG. 4. Alternatively, for example, the information processing device 20 can be configured using a plurality of devices. Still alternatively, the information processing device 20 can further include a sound input unit and a sound input unit.

Meanwhile, the information processing device 20 is not limited to a PC as illustrated in FIG. 1, and can alternatively be implemented using a smartphone, a cellular phone, a tablet terminal, or a dedicated terminal. Moreover, at least some part of the control unit 200 of the information processing device 20 can be implemented using a server on a network. Furthermore, the display unit 230 can be implemented using a projector, and the setting screen can be projected onto a wall, a table, or a screen. In that case, regarding the operation input of the user with respect to the projected screen, the touch operations with respect to the projected screen can be detected using a separately-installed camera.

<2-2. Configuration of Tactile Presentation Device 10>

Explained below with reference to FIG. 4 is a configuration of the tactile presentation device 10 according to the present embodiment. As illustrated in FIG. 4, the tactile presentation device 10 includes a plurality of tactile stimulation units 100a to 100c, a control unit 110, a communication unit 120, and a sound output unit 102.

The control unit 110 functions as an arithmetic processing device and a control device, and controls the overall operations in the tactile presentation device 10 according to various programs. The control unit 110 is implemented using, for example, an electronic circuit such as a CPU (Central Processing Unit) or a microprocessor. Moreover, the tactile presentation device 10 can include a ROM (Read Only Memory) that is used to store programs and operation parameters to be used, and a RAM (Random Access Memory) that is used to temporarily store parameters that undergo changes.

For example, according to the control signals for the output of tactile stimulation corresponding to each tactile stimulation unit 100 as received from the information processing device 20 via the communication unit 120, the control unit 110 controls the output of tactile stimulation (for example, vibrations) in each of the tactile stimulation units 100a to 100c.

The communication unit 120 sends information to and receives information from other devices. For example, the communication unit 120 receives, from the information processing device 20, control signals for the output of tactile stimulation corresponding to each tactile stimulation unit 100. Moreover, the communication unit 120 receives, from the information processing device 20, control signals for the output of the target sounds for reproduction. The communication unit 120 establishes communicable connection with other devices using, for example, a wired/wireless LAN (Local Area Network), Wi-Fi (registered trademark), Bluetooth (registered trademark), near field wireless communication, a mobile communication network (LTE (Long Term Evolution)), or 3G (3rd generation cellular mobile method).

Each tactile stimulation unit 100 is an actuator that offers tactile stimulation to the user. For example, the tactile stimulation unit 100 generates vibrations as tactile stimulation. However, the tactile stimulation offered by the tactile stimulation unit 100 is not limited to vibrations, and it is alternatively possible to think of, for example, stimulation of coldness, warmth, wind, water, or pressure.

The sound output unit 102 includes a speaker for reproducing sound signals, and an amplifier circuit for the speaker.

Till now, the explanation was given about an exemplary configuration of the tactile presentation device 10 according to the present embodiment. However, the configuration of the tactile presentation device 10 according to the present embodiment is not limited to the example illustrated in FIG. 4. For example, the tactile presentation device 10 can be configured to not include the sound output unit 102.

<<3. Examples of Setting Screen for Sensory Effect>>

Given below with reference to FIGS. 5 to 11 the specific explanation about the examples of the setting screen meant for setting the sensory effect according to the present embodiment.

Figure 5:
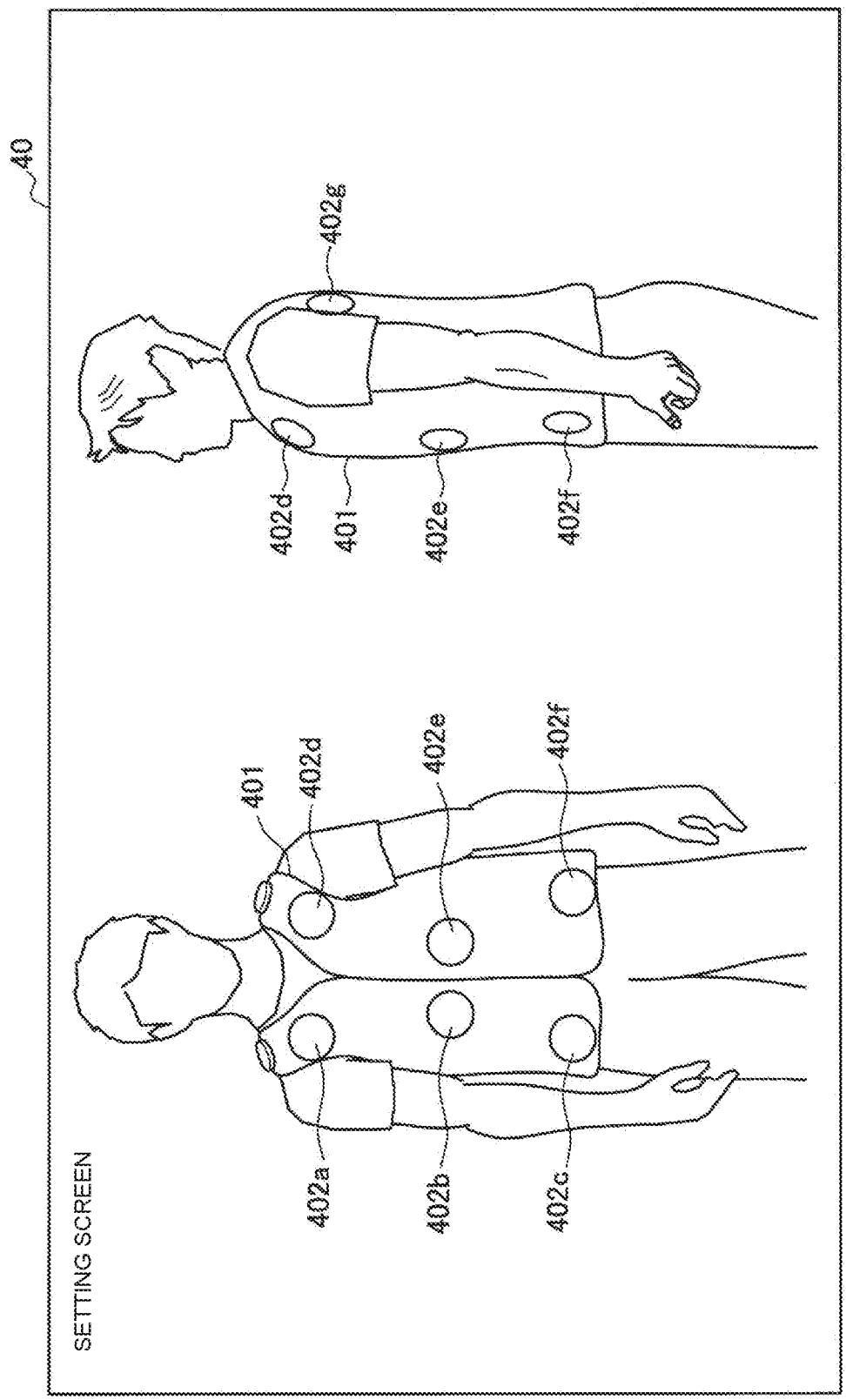
FIG. 5 is a diagram illustrating an example of a setting screen meant for setting the positions of tactile stimulation units according to the present embodiment.

FIG. 5 is a diagram illustrating an example of a setting screen 40 meant for setting the positions of the tactile stimulation units 100 according to the present embodiment. As illustrated in FIG. 5, in the setting screen 40, on a display 401 indicating the shape of, for example, the jacket-type tactile presentation device 10; a display 402a to a display 402g representing the tactile stimulation units 100 are displayed. The displays 402a to 402g representing the tactile stimulation units 100 can be moved to arbitrary positions by operating a cursor 403 using mouse operations, touch operations, or some other controller. Alternatively, the positions of the tactile stimulation units 100 can be already known. That is, already-generated 3D data of the tactile presentation device 10 can be incorporated, and the outside shape of the tactile presentation device 10 and the positions of the tactile stimulation units 100 disposed in the tactile presentation device 10 can be displayed.

In the example illustrated in FIG. 5, a front image and a lateral image are displayed. In addition, a rear image can also be displayed. Alternatively, the display can be switched among the front image, the lateral image, and the rear image according to the user operation.

Figure 6:
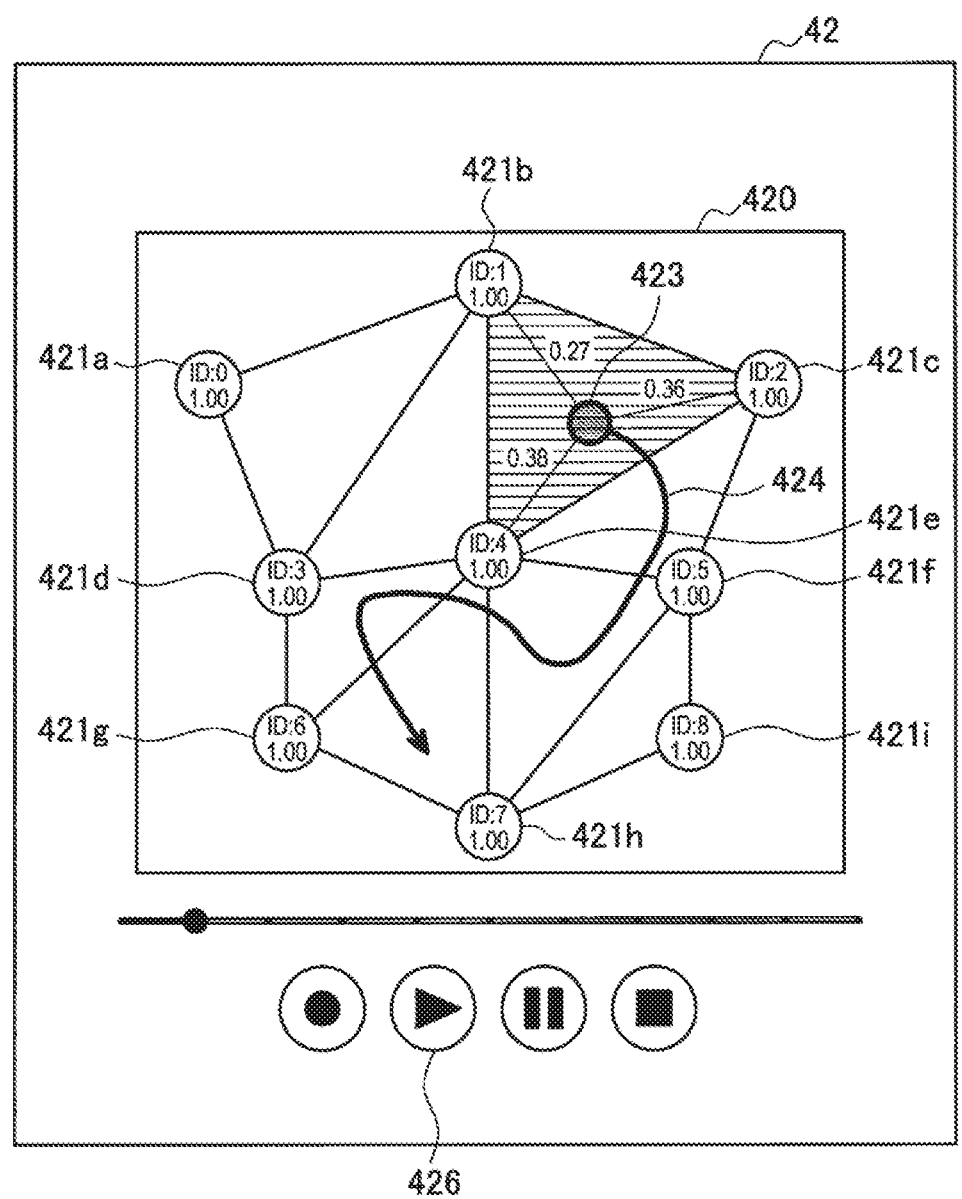
FIG. 6 is a diagram illustrating an example of a setting screen for setting the sensory effect according to the present embodiment.

FIG. 6 is a diagram illustrating an example of a setting screen 42 for setting the sensory effect according to the present embodiment. As illustrated in FIG. 6, in the setting screen 42, a display 420 indicating the placement of a plurality of tactile stimulation units 100 is displayed. The user specifies the position for generating tactile stimulation (i.e., specifies the sensory position) by performing a mouse operation. At the specified position, a sensory position display 423 is displayed. Moreover, in the case of wanting to continuously move the sensory position, the user can also specify a movement path 424 by performing a mouse operation. Furthermore, the user can also specify the movement speed of the sensory position.

When a reproduction button 426 in the setting screen 42 is selected, a video indicating the movement path of the sensory position is reproduced. That is, a video can be reproduced in which the sensory position display 423 moves along the movement path 424. That enables the user to confirm the setting. Moreover, when the reproduction button 426 is selected, the information processing device 20 can reproduce a video indicating the movement locus of the sensory position in the setting screen 42 displayed in the display unit 230, and can ensure that the corresponding output control of tactile stimulation is performed from the connected tactile presentation device 10. That enables the user to instantaneously receive the feedback of the sensory effect.

Figure 7:
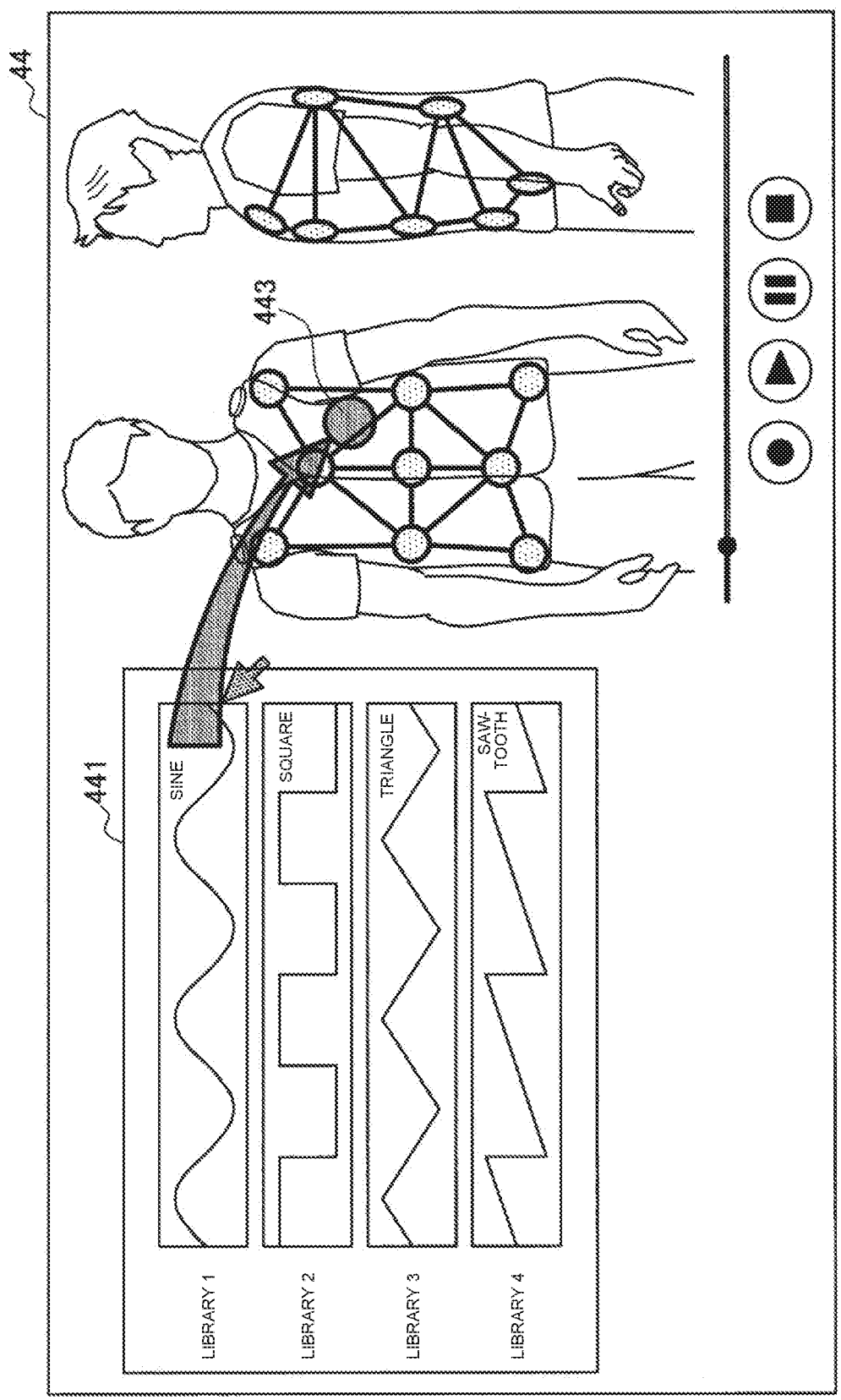
FIG. 7 is a diagram illustrating an example of a setting screen that enables setting the waveform type of tactile stimulation according to the present embodiment.

FIG. 7 is a diagram illustrating an example of a setting screen 44 that enables setting the waveform type of tactile stimulation. For example, it is possible to think of a plurality of types of tactile stimulation, such as impact vibrations. As illustrated in FIG. 7, the user can drag the mouse and move an arbitrary waveform type of tactile stimulation (the corresponding waveform data is also called a "library") to an arbitrary sensory position 443, and can set the type of tactile stimulation (for example, the type of vibration waveform) in the sensory position 443. Regarding the libraries, it is possible to set a large number of libraries in advance, or the information processing device 20 can generate libraries by incorporating arbitrary audio waveforms and video data. The information processing device 20 includes a filter/algorithm meant for converting media into signals of tactile stimulation. Moreover, the information processing device 20 can also recommend the most suitable library according to the location and the length of the movement path of the sensory position specified by the user and according to the movement speed of the sensory position.

Figure 8:
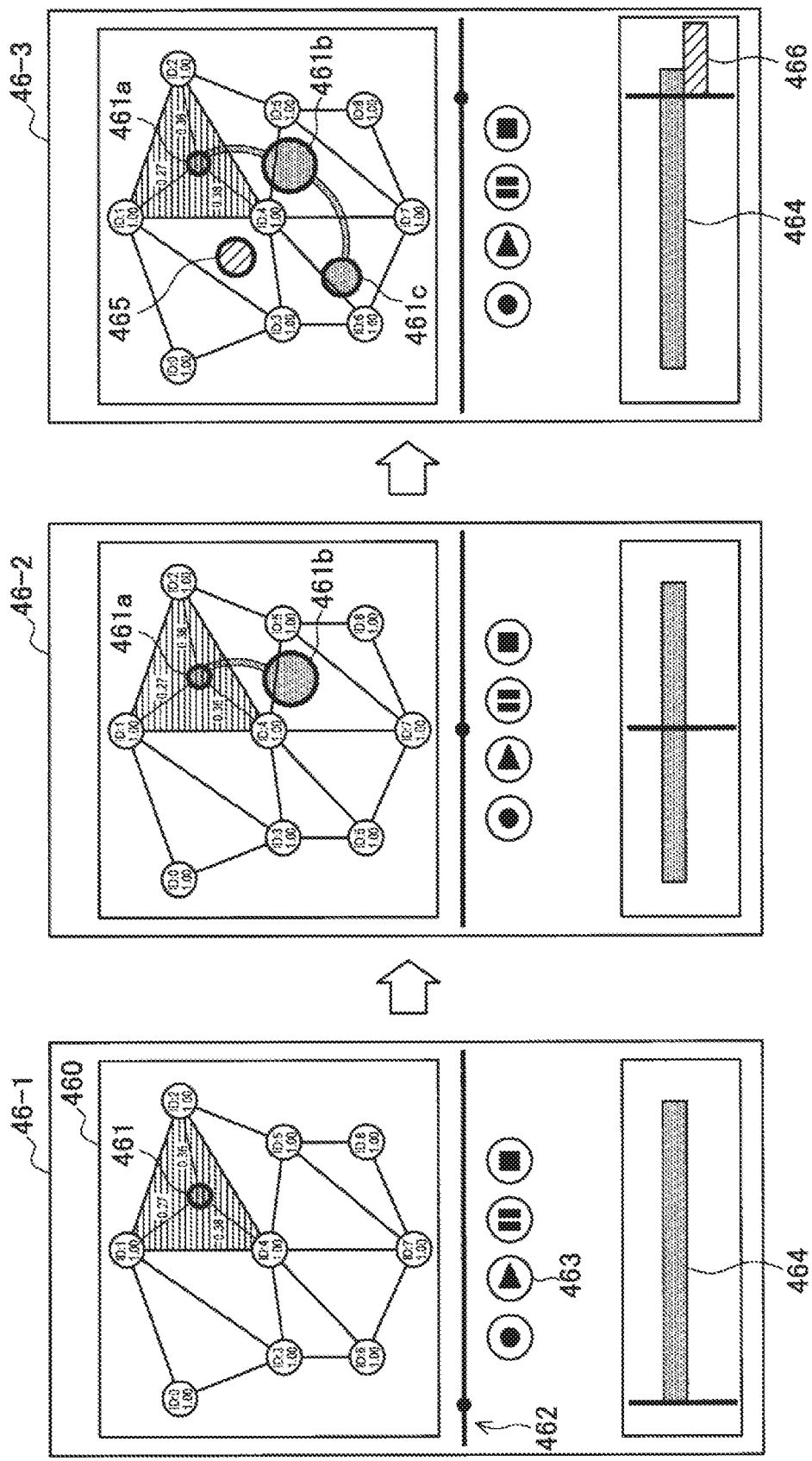
FIG. 8 is a diagram illustrating an example of reproduction screens for reproducing the sensory effect that is set according to the present embodiment.

FIG. 8 is a diagram illustrating an example of reproduction screens for reproducing the sensory effect that is set. As illustrated in FIG. 8, in reproduction screens 46-1 to 46-3, the following is displayed: a display screen 460 of the sensory position, a seek bar 462, and a contents bar 464 indicating the (temporal) length of tactile stimulation set at the concerned sensory position. When a reproduction button 463 is selected, the changes in the sensory position are displayed, and the seek position of the corresponding tactile stimulation contents also varies. Moreover, the intensity at the sensory position is displayed as, for example, the size of a display 461 of the sensory position. In the example illustrated in FIG. 8, at a sensory position 461*b* displayed in the reproduction screen 46-2, it can be seen that the sensory intensity has increased as compared to a sensory position 461*a* representing the start point. The user can confirm the sensory position and the sensory intensity by moving the seek bar.

Moreover, as illustrated in the reproduction screen 46-3, it is also possible to place a plurality of sensory effects. In that case, as illustrated in the reproduction screen 46-3, a contents bar 466 of the tactile stimulation corresponding to a sensory position 465 can also be displayed.

Furthermore, the user can be enabled to arbitrarily adjust the temporal length of the contents bars 464 and 466 (i.e., the length of tactile stimulation).

Meanwhile, although not illustrated in the drawings, in the reproduction screens for reproducing the sensory effect, the corresponding (synchronizing) video contents and acoustic contents can also be displayed in combination; and, along with the changes in the sensory position, the changes in the seek position of the contents can be made confirmable.

Moreover, in the setting screens for setting the sensory effect, the quality of stimulation (such as the presentation magnitude, gradually stronger/weaker, and temperature control) and the effects related to other modals (such as the illumination effect, the video effect, and the acoustic effect) can be made controllable.

Moreover, in the present embodiment, even if a plurality of different types of tactile stimulation units 100 (having different frequency characteristics, different response performances, or different sizes) are used, the control can be performed by correcting the differences therebetween.

Furthermore, in the present embodiment, when it can be expected to have an excessive output, it is possible to display a warning so as to ensure that the tactile presentation device 10 does not malfunction. For example, in the present embodiment, the output control signals are generated for the purpose of settling the specified sensory position and the specified sensory intensity. However, the output can be auto-corrected in such a way that, regarding the issues causing any burden to the human body, such as the tactile presentation period being too long or too strong, or the driving period being too long thereby producing heat, or low temperature burn injury or high temperature burn injury being caused due to a temperature presentation device; advance simulation is performed and accordingly a warning is displayed in the setting screen so as to avoid any burden to the user.

Moreover, in the present embodiment, in the setting screen, the intensity of tactile presentation can be expressed using the size of a marker, and the length of the presentation period can be expressed using the color or the degree of transparency of the marker.

Furthermore, in the present embodiment, when the movement of the sensory position is too speedy (i.e., the path is length), it is also possible to display the most suitable path and to perform auto-adjustment.

Moreover, in the present embodiment, the actual output need not be strictly in tandem with respect to the sensor effect specified by the user. For example, even if the setting is such that 100 different tactile stimulations are generated in a short period of time, the actual output can be held down to about 10 times. In that case, the count or the presentation period after the optimization may or may not be displayed in the setting screen.

When the sensory position is close to the stomach (using the expression such as a ball hits the stomach), the volume of the headphones (i.e., the volume of the corresponding acoustic) can be reduced. On the other hand, when the sensory position is close to the chest, the volume can be increased. Thus, according to the sensory position, the acoustic effect and the video effect can be auto-adjusted.

Moreover, in the present embodiment, eventually, control signals for a few minutes in the tactile presentation device 10 can be output, or the tool itself can function as a player (reproduction software).

(Recommendations Regarding Placement of Tactile Stimulation Units 100)

In the examples explained above, the placement of the tactile stimulation units 100 is decided before setting the sensory position. However, the present embodiment is not limited to that case. Alternatively, based on an arbitrary sensory position and an arbitrary movement path specified by the user, the information processing device 20 can recommend the most suitable placement of the tactile stimulation units 100. As the most suitable placement, for example, it is possible to think of such placement by which the tactile presentation can be done at least at the set sensory position and which enables achieving power saving and load reduction. At that time, the user can be enabled to input the number of usable tactile stimulation units 100 and information such as restrictions on the installable range.

Figure 9:
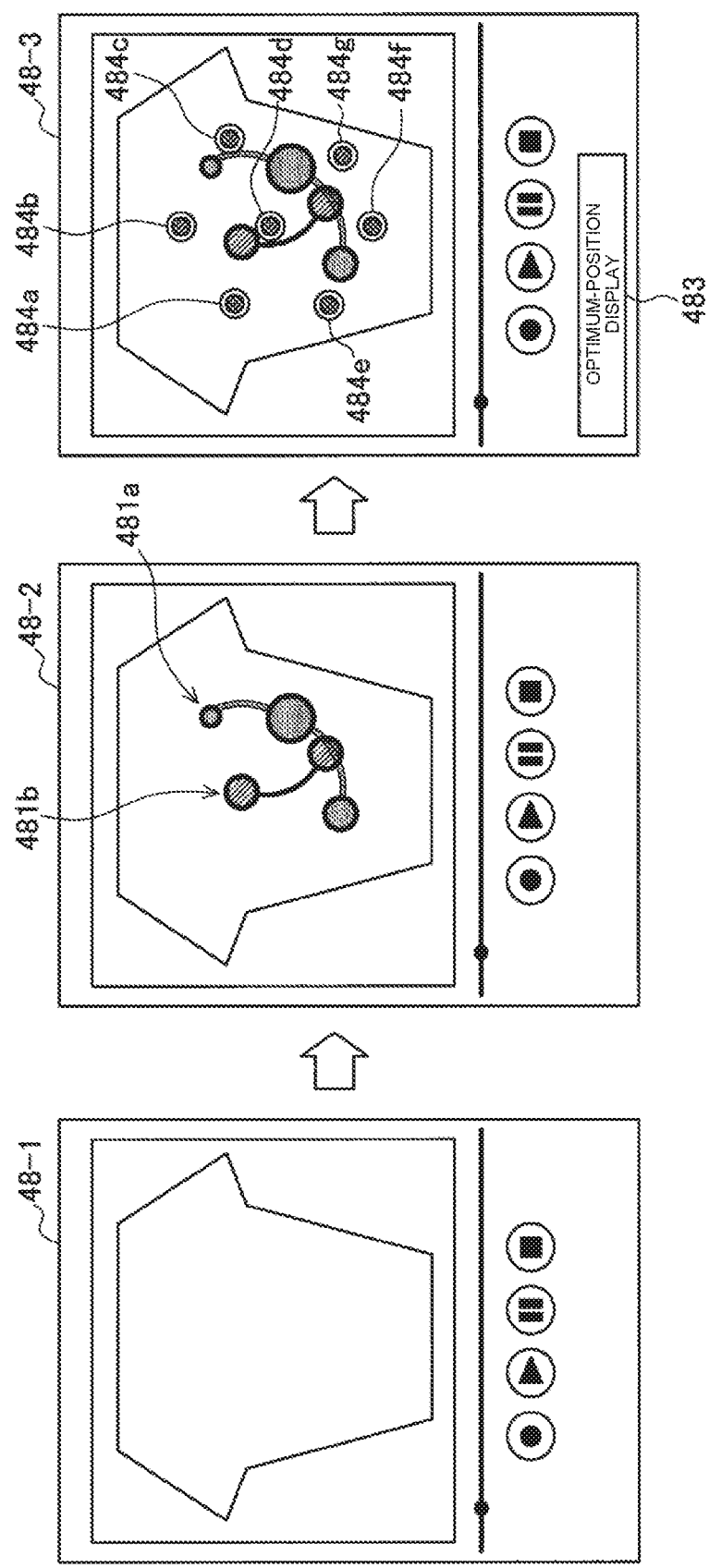
FIG. 9 is a diagram illustrating an example of placement recommendation of a plurality of tactile stimulation units according to the present embodiment.

FIG. 9 is a diagram illustrating an example of placement recommendation of a plurality of tactile stimulation units 100. Firstly, as illustrated in the left-side portion in FIG. 9, in a setting screen 48-1, only the outline form of the tactile presentation device 10 is displayed. Then, as illustrated in the middle portion in FIG. 9, in a setting screen 48-2, the user draws movement paths 481*a* and 481*b* of one or more sensory positions inside the outline form of the tactile presentation device 10, and performs the sensory effect setting. Subsequently, as illustrated in the right-side portion in FIG. 9, in a setting screen 48-3, for example, when an optimum-position display button 483 is selected, the most suitable placement of a plurality of tactile stimulation units 100 (i.e., a display 484*a* to a display 484*f*) is displayed to enable implementation of the set sensory effect.

Meanwhile, the recommendation about the most suitable placement of a plurality of tactile stimulation units 100 also includes a revised proposal about the already-disposed tactile stimulation units 100. The related explanation is given below with reference to FIG. 10.

Figure 10:
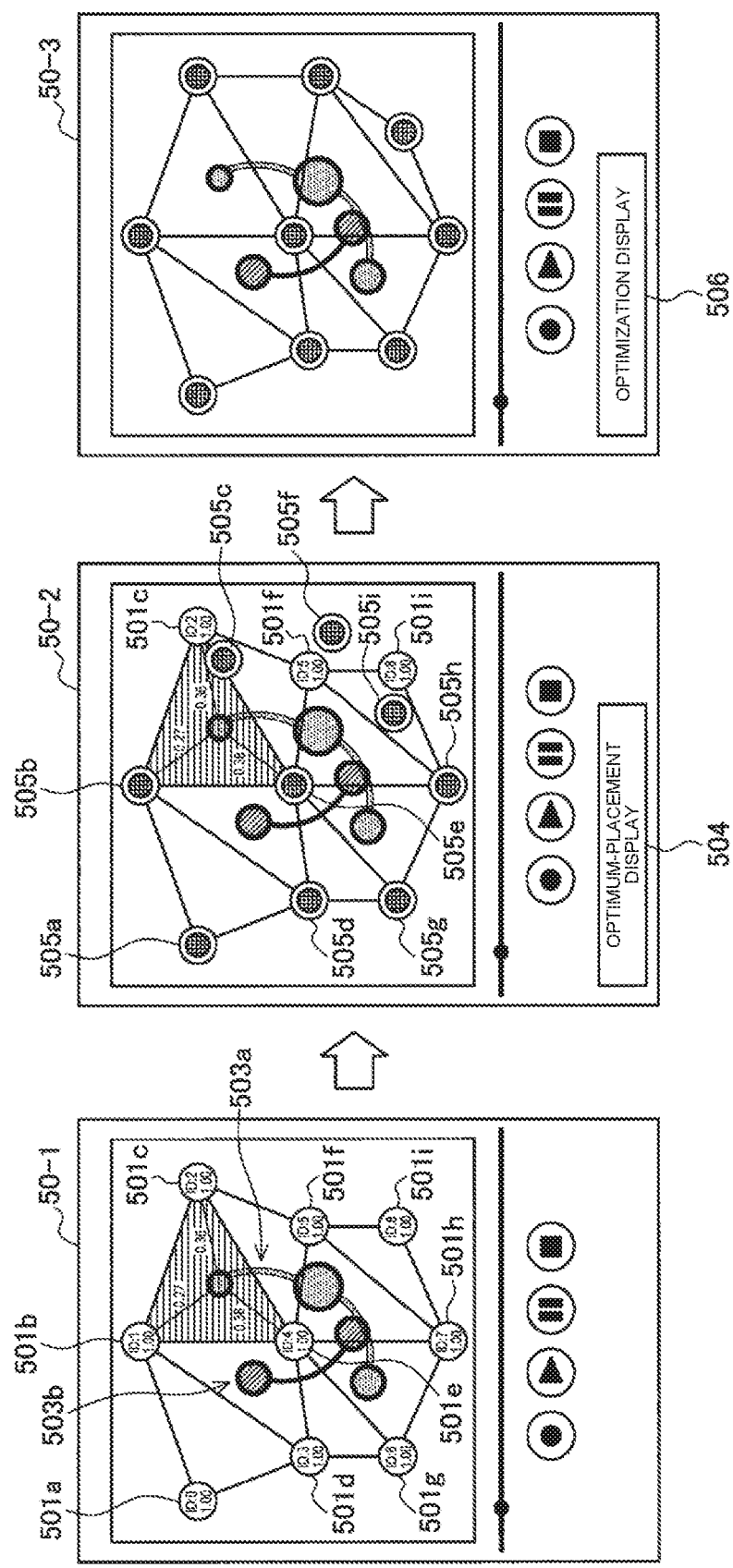
FIG. 10 is a diagram illustrating an example of placement revision of a plurality of tactile stimulation units according to the present embodiment.

FIG. 10 is a diagram illustrating an example of placement revision of a plurality of tactile stimulation units 100. Firstly, as illustrated in the left-side portion in FIG. 10, in a setting screen 50-1, when a display 501*a* to a display 501*i* indicating the positions of a plurality of tactile stimulation units 100 as set in advance (or as arbitrarily disposed by the user) are displayed; the user operates the mouse and draws movement paths 503*a* and 503*b* of the target sensory positions. Then, as illustrated in the middle portion in FIG. 10, in a setting screen 50-2, when the user selects an optimum-placement display button 504, the information processing device 20 calculates the most suitable positions of the tactile stimulation units 100 according to the specified movement paths 503*a* and 503*b* of the sensory positions; and displays, in a superimposed manner, a display 505*a* to 505*i* indicating the most suitable positions of the tactile stimulation units 100, as illustrated in the drawing. In the example illustrated in FIG. 10, it can be seen that the displays 501*c*, 501*f*, and 501*i* of the tactile stimulation units 100 as set in advance are misaligned with displays 505*c*, 505*f*, and 505*i* indicating the most suitable positions; and that the misalignment is corrected.

Then, as illustrated in the right-side portion in FIG. 10, in a setting screen 50-3, when the user selects an optimization display button 506, the state is displayed in which the tactile stimulation units 100 are changed to their most suitable positions, and that state is finalized. According to the most suitable positions of the tactile stimulation units 100 presented in this manner, the user becomes able to adjust the placement of the actual tactile stimulation units 100 in the tactile presentation device 10.

Figure 11:
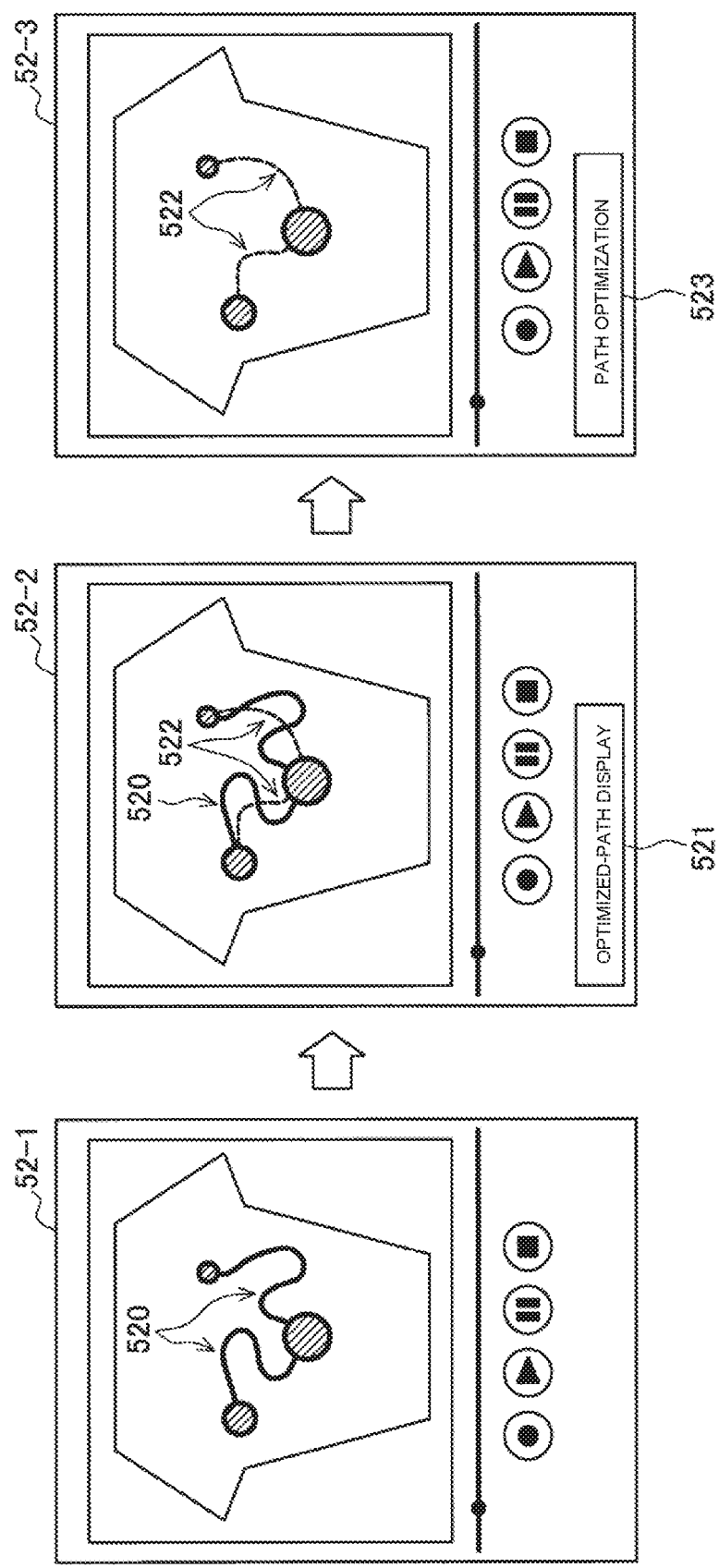
FIG. 11 is a diagram illustrating an example of optimization display of the movement path of the sensory position according to the present embodiment.

Explained below with reference to FIG. 11 is the recommendation about the most suitable path of the specified sensory position. FIG. 11 is a diagram illustrating an example of optimization display of the movement path of the sensory position.

As illustrated in FIG. 11, in a setting screen 52-1, firstly, the user inputs the sensory position and a movement path 520. Then, in a setting screen 52-2, when an optimized-path display button 521 is selected, the information processing device 20 calculates the most suitable path of the sensory position and displays it as a most suitable path 522. The most suitable path can be calculated by taking into account, for example, the effect on the human body, the load on the tactile stimulation units 100, and the placement of the surrounding tactile stimulation units 100.

Then, as illustrated in the right-side portion in FIG. 11, in a setting screen 52-3, when the user selects a path optimization button 523, the optimization of the movement path of the sensory position gets finalized.

<<4. Operations>>

Figure 12:
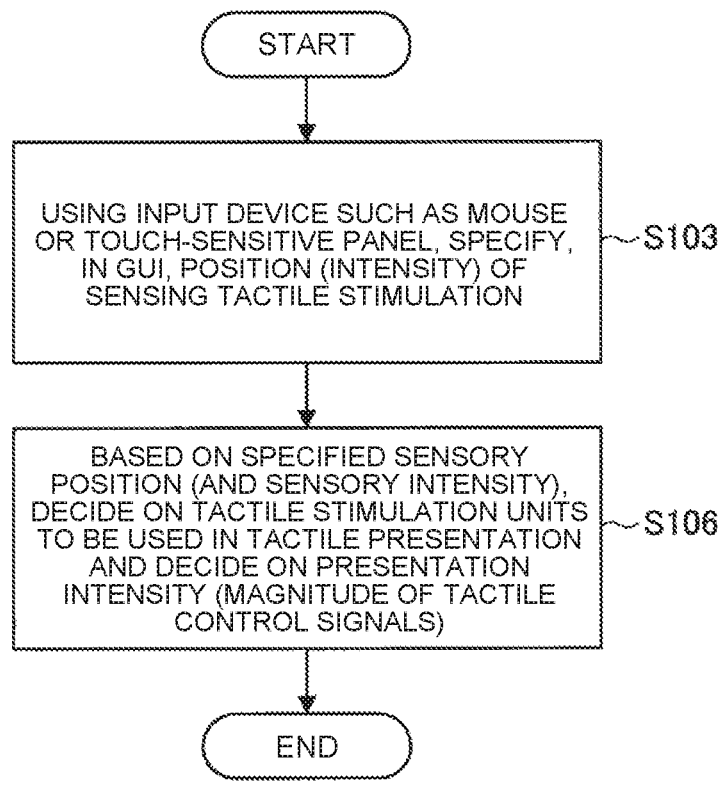
FIG. 12 is a flowchart for explaining a decision operation performed for deciding on the tactile stimulation according to the present embodiment.

Explained below with reference to FIG. 12 are the operations performed in the information processing system according to the present embodiment. FIG. 12 is a flowchart for explaining a decision operation performed for deciding on the tactile stimulation according to the present embodiment.

As illustrated in FIG. 12, firstly, using an input device such as a mouse of a touch-sensitive panel, the position (and the intensity) of sensing tactile stimulation is specified in the GUI (Step S103).

Then, based on the specified sensory position (and the sensory intensity), the information processing device 20 decides on the tactile stimulation units 100 to be used in tactile presentation and decides on the presentation intensity (the magnitude of the tactile control signals output from the tactile stimulation units 100) (Step S106).

The contents decided in this manner can be output to the tactile presentation device 10 in response to, for example, an operation of a reproduction button in the GUI. The user can perform intuitive setting of the sensory effect in the GUI and can confirm the set sensory effect by instantly feeling it in the tactile presentation device 10; as well as can adjust the setting in a repeated manner.

Meanwhile, the setting of the sensory effect is not limited to using a mouse or a touch-sensitive panel. Alternatively, the setting can be directly input on the real object using a tactile pointer (a 3D pointer). Given below is the explanation about such a pointer.

<<5. Tactile Pointer>>

Figure 13:
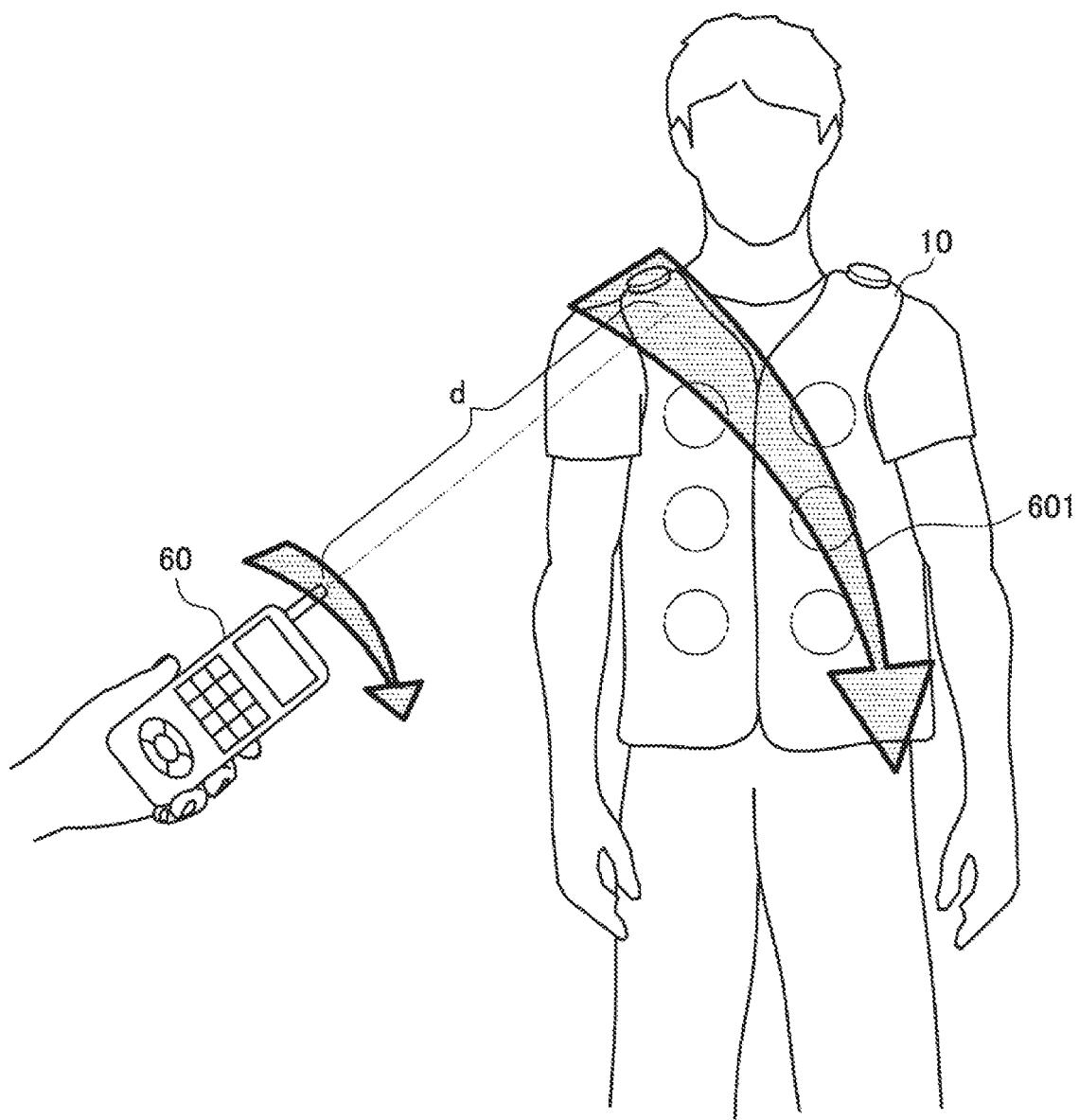
FIG. 13 is a diagram for explaining a tactile pointer according to the present embodiment.

FIG. 13 is a diagram for explaining a tactile pointer 60 according to the present embodiment. As illustrated in FIG. 13, when the tactile pointer 60 is moved toward the tactile presentation device 10, it becomes possible to intuitively draw a locus 601 on the tactile presentation device 10 (the real object), and set the sensory position and the movement path of the sensory position. The locus 601 that is drawn on the tactile presentation device 10 can be displayed in a display unit 640 of the tactile presentation device 10; or visible light rays of LEDs can be emitted from the tactile presentation device 10 and the locus 601 thereon can be made visible.

Alternatively, the tactile presentation control (the output control of tactile stimulation) in the tactile presentation device 10 can be performed in real time in order to enable the tactile pointer 60 or the information processing device 20, which is connected to the tactile pointer 60, to offer tactile stimulation along the locus drawn using the tactile pointer 60. As a result, the user becomes able to specify the movement path of the sensory position in real time, as well as to feel the sensory effect. Meanwhile, the user who is wearing the tactile presentation device 10 can himself or herself operate the tactile pointer 60. Even if the user does not have the technical know-how, he or she can confirm the sensory effect in real time using the tactile pointer 60 and can create data according to his or her experience.

The recognition of the locus 601 can be performed in the following manner, for example: a distance d to the target (the tactile presentation device 10) is detected using a distance sensor of IR (infrared rays) emitted from the tactile pointer 60, and the three-dimensional position of the target (i.e., the relative position with respect to the tactile pointer 60) is obtained; and the movement of the tactile pointer 60 is obtained using an attitude sensor such as a gyro sensor or an acceleration sensor installed in the tactile pointer 60.

Meanwhile, regarding the positions of the tactile stimulation units 100 disposed in the tactile presentation device 10; either the positions can be known positions, or the positions can be detected using a camera installed in the tactile pointer 60; or the user can specify and store the positions (the relative positions) of the tactile stimulation units 100 using the tactile pointer 60.

Meanwhile, in the tactile pointer 60, an operation input unit 620, such as recording start/stop buttons or reproduction start/stop buttons, is disposed. When the user selects the recording start button, the tactile pointer 60 emits infrared rays and starts the recognition of the three-dimensional position of the target (the tactile presentation device 10). Subsequently, when the recording stop button is pressed, the tactile pointer 60 ends the recognition of the three-dimensional position, and stores the movement path of the recognized three-dimensional position (i.e., stores the locus 601 on the tactile presentation device 10). Moreover, when the reproduction start button is selected, the tactile pointer 60 starts the output control from the tactile presentation device 10 in such a way that the stored data is played back, that is, tactile stimulation is offered along the stored locus 601 on the tactile presentation device 10.

<5-1. Configuration>

Figure 14:
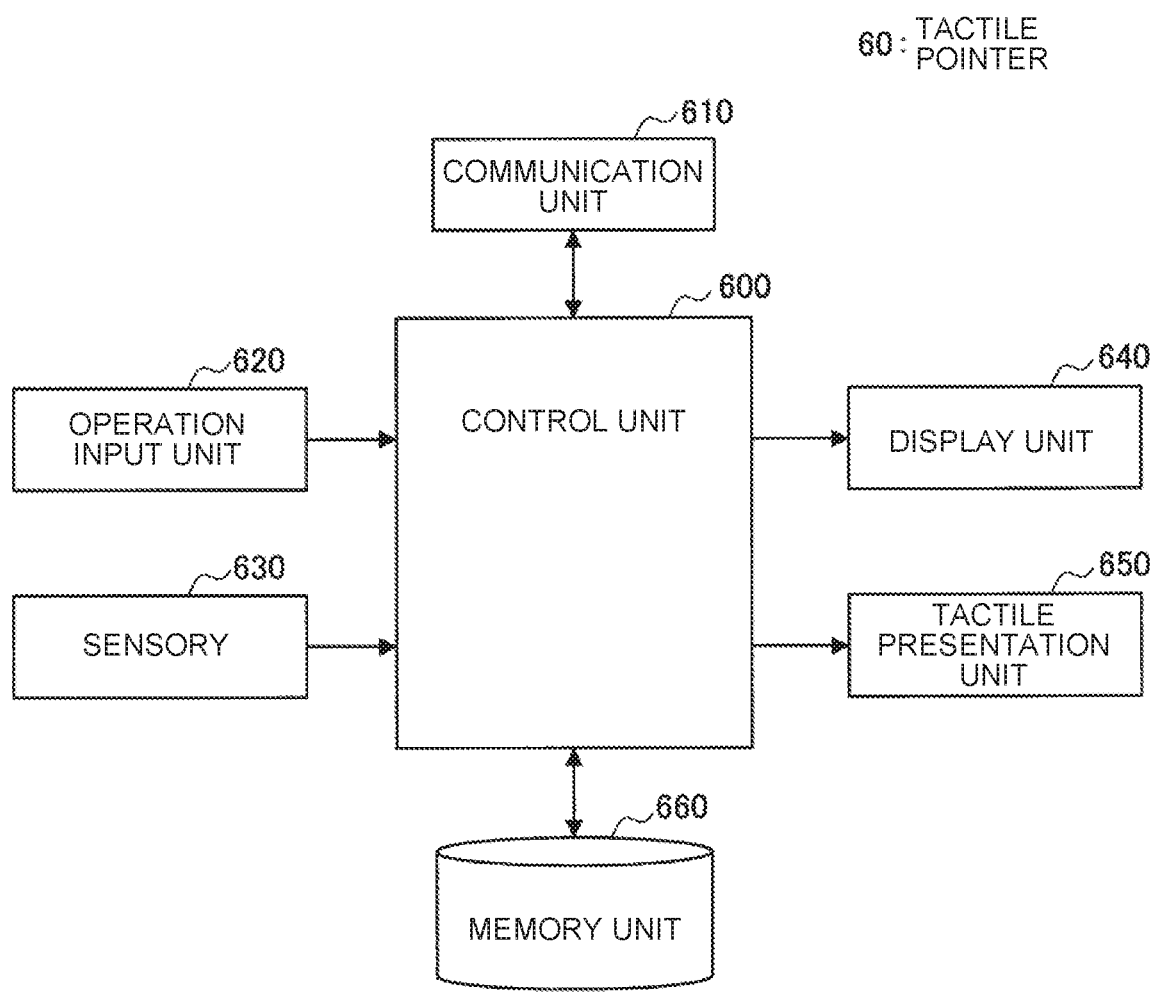
FIG. 14 is a block diagram illustrating an exemplary configuration of the tactile pointer according to the present embodiment.

Explained below with reference to FIG. 14 is an exemplary configuration of the tactile pointer 60 according to the present embodiment. As illustrated in FIG. 14, the tactile pointer 60 includes a control unit 600, a communication unit 610, the operation input unit 620, a sensor 630, a display unit 640, a tactile presentation unit 650, and a memory unit 660.

The control unit 600 functions as an arithmetic processing device a control device, and controls the overall operations in the tactile pointer 60 according to various programs. The control unit 600 is implemented using, for example, an electronic circuit such as a CPU (Central Processing Unit) or a microprocessor. Moreover, the control unit 600 can include a ROM (Read Only Memory) that is used to store programs and operation parameters to be used, and a RAM (Random Access Memory) that is used to temporarily store parameters that undergo changes.

The control unit 600 according to the present embodiment can perform the following operations in response to a user operation input from the operation input unit 620: library (tactile type) selection, intensity adjustment, recording start/stop (storing recorded multichannel tactile data), reproduction/stop (playback of recorded data), setting of the tactile presentation dimensions (narrow/wide), tactile presentation mode selection (surface tracing (boundary contrast setting of presentation (clear/vague)), penetrative expression (presentation of the feeling of being shot by a gun), temperature adjustment (presentation setting of the feeling of temperature), and force adjustment (presentation setting of the sense of force). Herein, the information about vibrations, temperature, and force can be included in a single library.

Moreover, based on the detection result obtained by the sensor 630, the control unit 600 can recognize the locus on the tactile presentation device 10. More particularly, for example, the control unit 600 detects the distance d to the tactile presentation device 10 using infrared rays or beacon (Bluetooth), or using a camera; and obtains the position (the three-dimensional position) of the tactile presentation device 10 with respect to the tactile pointer 60. Then, the control unit 600 detects the movement of the tactile pointer 60 according to the detection result of the attitude sensor, and recognizes the locus on the tactile presentation device 10 along with recognizing the three-dimensional position of the tactile presentation device 10. Furthermore, the control unit 600 can recognize the shape of the tactile presentation device 10 by analyzing the captured images that are captured by the camera installed in the tactile pointer 60, and can also recognize the relative position with respect to the tactile presentation device 10.

Moreover, the control unit 600 can obtain the positions of the tactile stimulation units 100 disposed in the tactile presentation device 10, and can generate output control signals in the tactile stimulation units 100 for the purpose of tactile presentation along the specified locus. Herein, the generation method is same as the method explained with reference to the tactile position/intensity deciding unit 201 of the information processing device 20. Meanwhile, the positions of the tactile stimulation units 100 disposed in the tactile presentation device 10 can be input by the user using the tactile pointer 60. For example, the user points to the tactile stimulation units 100 in the tactile presentation device 10 using the tactile pointer 60, and obtains the target three-dimensional positions using the tactile pointer 60 as well as registers the three-dimensional positions as "the positions of the tactile stimulation units 100". Moreover, in the tactile presentation device 10, when markers (such as LEDs, infrared markers, or QR codes (registered trademark)) are provided at the locations corresponding to the positions of the tactile stimulation units 100, the control unit 600 can detect the markers using the camera images and obtain the positions of the tactile stimulation units 100.

Alternatively, the control unit 600 can obtain three-dimensional position information from the tactile presentation device 10 or from each tactile stimulation unit 100.

The communication unit 610 sends information to and receives information from other devices. For example, the communication unit 610 can obtain update information of the libraries from a network, can upload recording data, and can send it the information processing device 20. Moreover, the communication unit 610 can send output control signals (controls signals for the output of tactile stimulation) to the tactile presentation device 10 or the tactile stimulation units 100. The communication unit 610 establishes communicable connection with other devices using, for example, a wired/wireless LAN (Local Area Network), Wi-Fi (registered trademark), Bluetooth (registered trademark), near field wireless communication, a mobile communication network (LTE (Long Term Evolution)), or 3G (3rd generation cellular mobile method).

The operation input unit 620 receives an operation instruction from the user, and outputs the operation details to the control unit 600. The operation input unit 620 can be a touch sensor, a pressure sensor, or a proximity sensor.

Alternatively, the operation input unit 620 can have a physical configuration such as a keyboard, a mouse, a button, a switch, and a lever.

The sensor 630 includes, for example, a three-dimensional position sensor (an infrared sensor, a beacon, or what is called a distance sensor of a camera), or an attitude sensor (a gyro sensor or an acceleration sensor). Moreover, the sensor 630 can include an infrared camera or an RGB camera that detects the markers indicating the positions of the tactile stimulation units 100 disposed in the tactile presentation device 10.

The display unit 640 is a display device that outputs various operation screens and a screen displaying the input locus (the movement path of the sensory position). Examples of the display unit 640 include a display device such as a liquid crystal display (LCD) or an organic EL (Electro Luminescence) display.

The tactile presentation unit 650 has the function of giving a feedback to the hand of the user in which the tactile pointer 60 is held. For example, the tactile presentation unit 650 can offer vibrations, force, or temperature as tactile stimulation. For example, when the user is inputting the sensory effect to the tactile presentation device 10, the tactile presentation unit 650 can present vibrations in real time. As a result, even when the operator of the tactile pointer 60 is not wearing the tactile presentation device 10, he or she can understand the set tactile sense in real time.

The memory unit 660 is implemented using a ROM (Read Only Memory) that is used to store programs and operation parameters to be used in the operations of the control unit 600, and a RAM (Random Access Memory) that is used to temporarily store parameters that undergo changes. For example, the memory unit 660 can be used to store the libraries and the recorded data.

Till now, the specific explanation was given about a configuration of the tactile pointer 60 according to the present embodiment. Meanwhile, the configuration illustrated in FIG. 14 is only exemplary, and the present embodiment is not limited to that configuration. Alternatively, for example, the tactile pointer 60 can be configured to not include the display unit 640 or the tactile presentation unit 650.

<5-2. Examples of Setting Operations of Sensory Effect>

Given below is the explanation, with reference to the drawings, of specific examples of setting operations of the sensory effect using the tactile pointer 60 according to the present embodiment.

Figure 15:
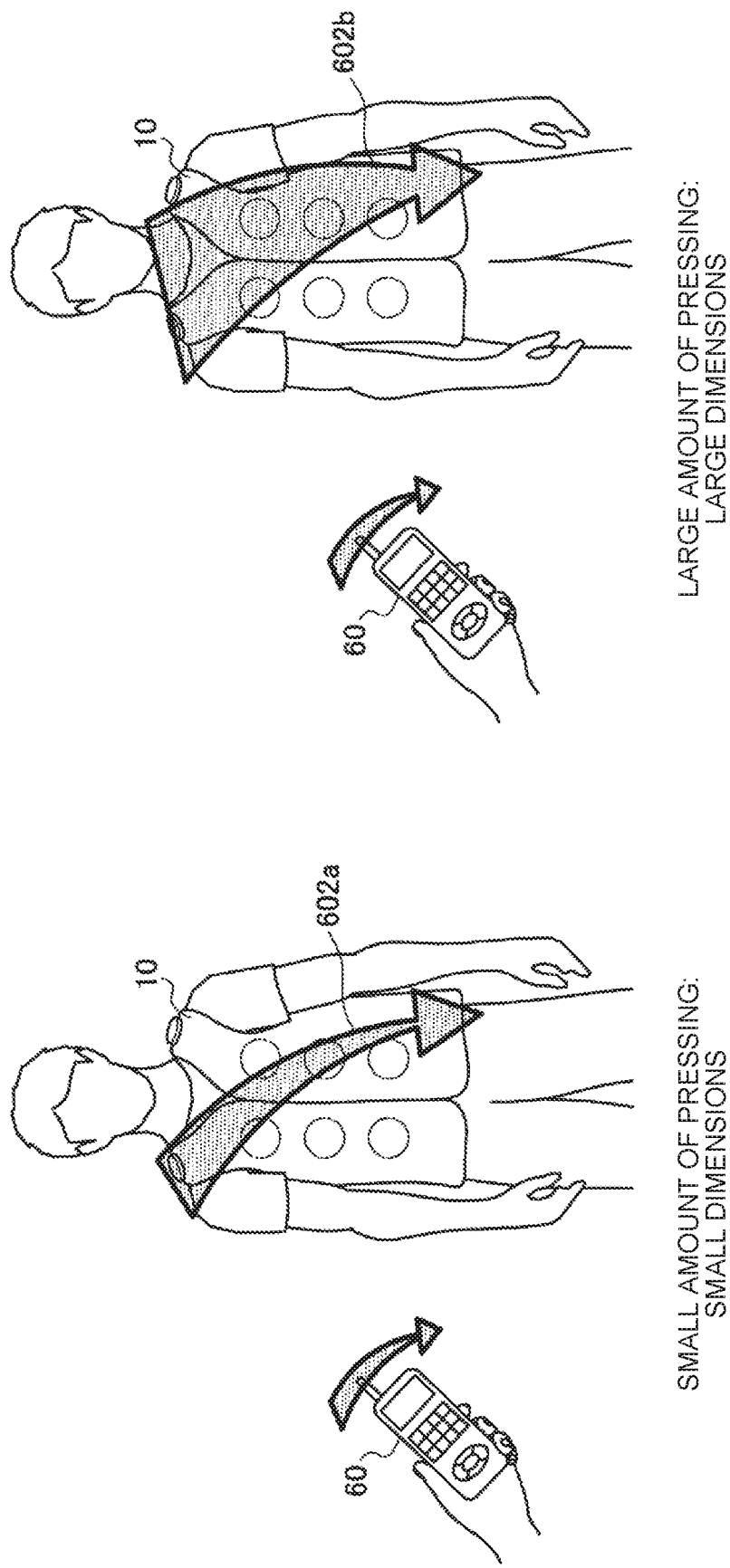
FIG. 15 is a diagram for explaining the adjustment of the presentation dimensions of tactile stimulation as performed by button operations of the tactile pointer according to the present embodiment.

FIG. 15 is a diagram for explaining the adjustment of the presentation dimensions of tactile stimulation as performed by button operations of the tactile pointer 60. The presentation dimensions of tactile stimulation can be varied according to, for example, the amount of pressing of a predetermined button in the tactile pointer 60. For example, as illustrated in the left-side portion in FIG. 15, when the amount of pressing of the button is small, the presentation dimensions become small (narrow); and, as illustrated in the right-side portion in FIG. 15, when the amount of pressing of the button is large, the presentation dimensions become large (wide). Herein, concerned loci 602*a* and 602*b* can be made visible using the LEDs emitted from the tactile pointer 60.

Figure 16:
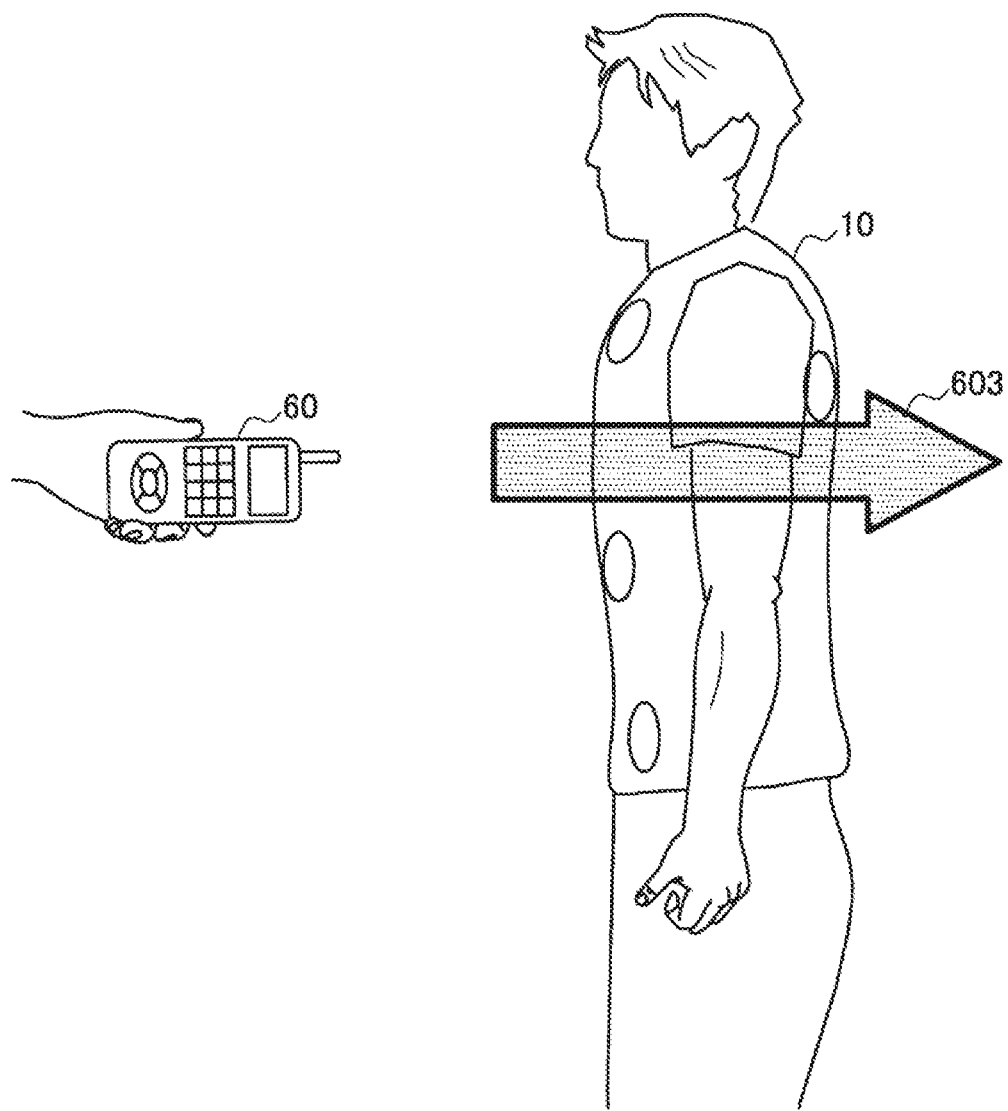
FIG. 16 is a diagram for explaining the case of setting the movement path of the sensory position passing through the body according to the present embodiment.

FIG. 16 is a diagram for explaining the case of setting the movement path of the sensory position passing through the body. In the tactile pointer 60, it is possible to select the type of tactile stimulation presentation; and it is possible to think of, for example, a "penetration mode" and a "surface tracing mode". If the penetration mode is selected, as illustrated in FIG. 7, it becomes possible to input a movement path that joins the front side of the body of the user, who is wearing the tactile presentation device 10, to the back side through the inside, that is, to input a movement path that passes through the body of the user. In that state, if the body is traced using the tactile pointer 60, it becomes possible to offer a sensation as if the body is cut completely in half by a sword. On the other hand, in the "surface tracing mode", it is also possible to set the boundary contrast of tactile presentation. For example, in "surface tracing—pencil", a sensation can be presented in which the boundary of tactile presentation is clear. In contrast, in "surface tracing—brush", a sensation can be presented in which the boundary of tactile presentation is vague.

Moreover, if the tactile pointer 60 is moved back and forth in the substantially vertical direction with respect to the tactile presentation device 10, then it becomes possible to vary the intensity of pressure presentation according to the distance.

Figure 17:
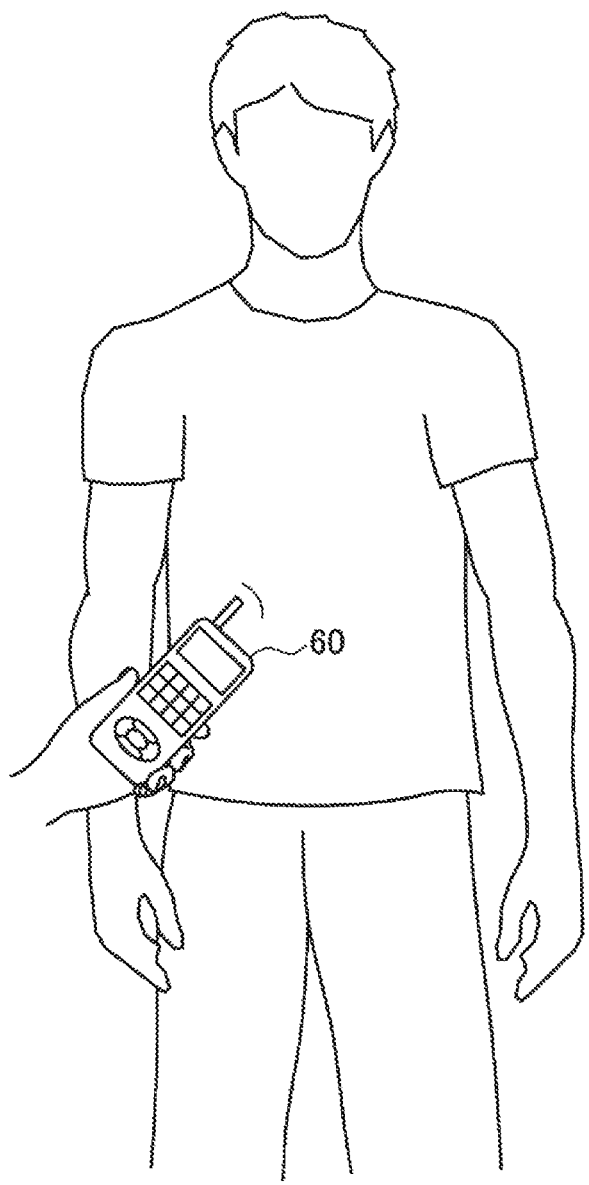
FIG. 17 is a diagram for explaining the case in which the sensory effect is set using only the tactile pointer and without using the tactile presentation device according to the present embodiment.

FIG. 17 is a diagram for explaining the case in which the sensory effect is set using only the tactile pointer 60 and without using the tactile presentation device 10. As illustrated in FIG. 17, a locus can be drawn with the leading end of the tactile pointer 60 kept in direct contact with the body (an example of the real object), and the movement path of the sensory position on the body can be set. The tactile pointer 60 can obtain the three-dimensional coordinate information of its leading end. At that time, tactile presentation such as vibrations or temperature variation can also be performed at the leading end of the tactile pointer 60.

In the case of actually reproducing the set movement path of the sensory position in the tactile presentation device 10, the tactile pointer 60 or the information processing device 20 takes into consideration the three-dimensional position information representing the recorded locus on the body or takes into consideration the position information of each tactile stimulation unit 100 disposed in the tactile presentation device 10 that is put on the body; and decides on the output level from the surrounding tactile stimulation units 100 (i.e., decides on the intensity of the tactile control signals).

Figure 18:
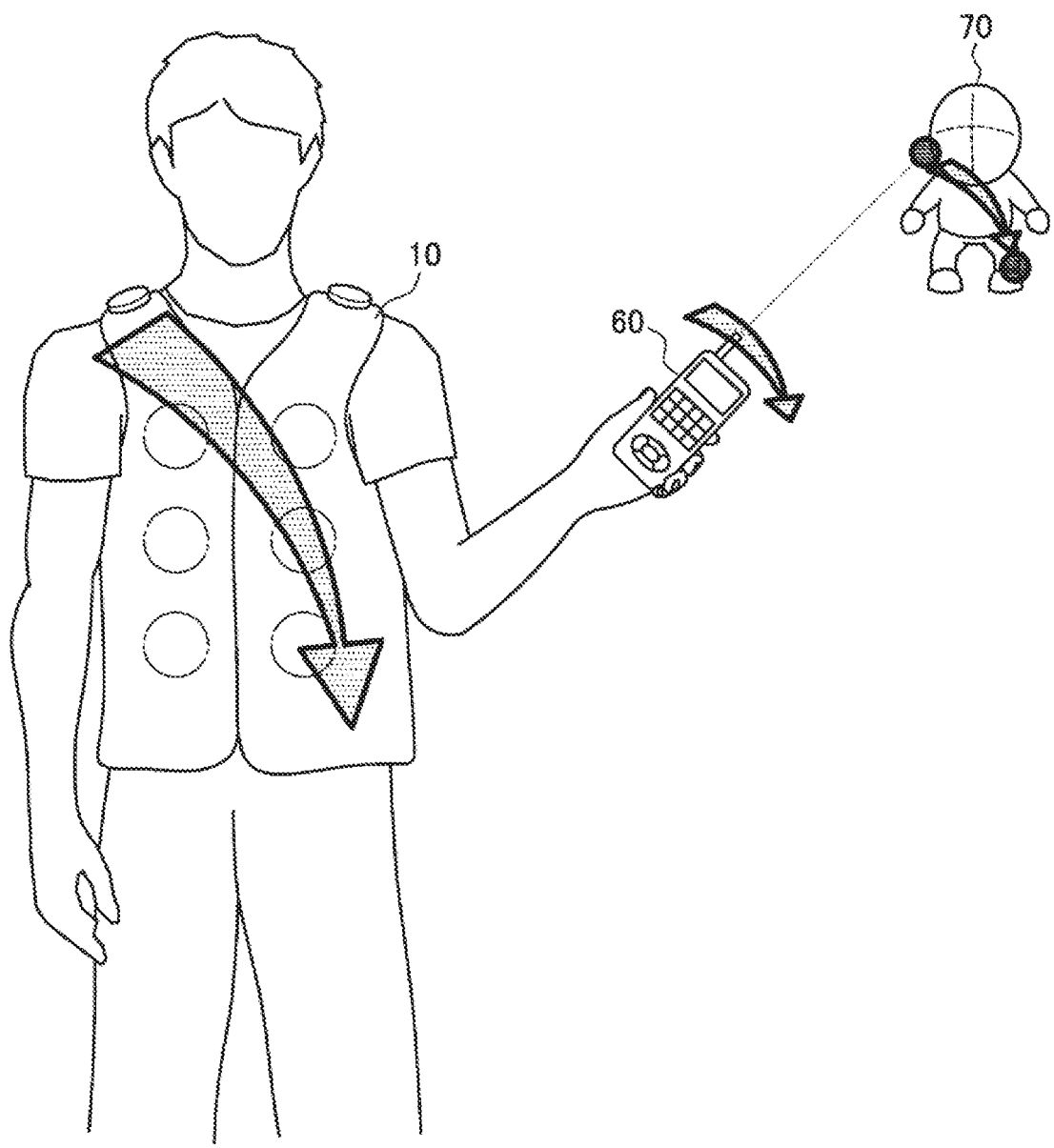
FIG. 18 is a diagram for explaining about setting the sensory effect using a doll according to the present embodiment.

FIG. 18 is a diagram for explaining about setting the sensory effect using a doll. As illustrated in FIG. 18, for example, while wearing the tactile presentation device 10, the user draws a locus on a doll 70 (an example of the real object) using the tactile pointer 60, and can receive a feedback (in real time) in the tactile presentation device 10 about the tactile stimulation corresponding to the locus. At that time, a laser pointer can be used in the tactile pointer 60 for emitting light and making the sensory position visible. The tactile pointer 60 obtains the three-dimensional position of the doll using a distance sensor, detects its own movement using an attitude sensor, and accordingly detects the locus drawn on the body of the doll. Alternatively, the tactile pointer 60 can obtain the illumination position of the laser pointer on the doll using a camera, and accordingly can detect the locus drawn on the body of the doll.

Alternatively, the user draws the locus by moving the tactile pointer 60 while pressing the record button thereof. When the user releases the record button, the tactile pointer 60 stores data equivalent to a plurality of channels (i.e., stores the output control signals for each tactile stimulation unit 100 as generated according to the drawn locus).

FIG. 19 is a diagram for explaining about a variety of ways of setting the sensory effect using a doll. As illustrated in the upper portion in FIG. 19, while illuminating the doll 70 with the laser pointer of the tactile pointer 60 and checking the position, the user can treat the doll 70 as the person wearing the tactile presentation device 10 and can input the movement path of the sensory position. Herein, there is no particular restriction on the size of the doll 70. When the size of the doll 70 is different than the size of the tactile presentation device 10 (or the size of the person wearing the tactile presentation device 10), the tactile pointer 60 performs scale matching according to the size of the doll and the size of the tactile presentation device 10 (or the size of the body of the person).

As illustrated in the middle portion in FIG. 19, the intensity of the tactile presentation can be expressed using the concentration of illumination by the laser pointer. The user can operate the buttons of the tactile pointer 60 and adjust the intensity of tactile presentation. Herein, there is a visual feedback of the adjustment to the user. Hence, for example, when the tactile presentation is weak, the user can illuminate a pointer 606a having a faint color; and, when the tactile presentation is intense, the user can illuminate a pointer 606b having a dark color.

As illustrated in the lower portion in FIG. 19, the range of tactile presentation can be expressed also according to the magnitude of illumination by the laser pointer. The user can operate the buttons of the tactile pointer 60 and adjust the range of tactile presentation. Herein, there is a visual feedback of the adjustment to the user. Hence, for example, when the range of tactile presentation is narrow, a small pointer 607a is used for illumination; and, when the range of tactile presentation is wide, a large pointer 607b is used for illumination.

<<5. Summary>>

As described above, in the information processing system according to the embodiment of the application concerned, it becomes possible to perform intuitive operations related to the setting of the sensory position of tactile stimulation.

Although the application concerned is described above in detail in the form of an embodiment with reference to the accompanying drawings; the technical scope of the application concerned is not limited to the embodiment described above. That is, the application concerned is to be construed as embodying all modifications such as other embodiments, additions, alternative constructions, and deletions that may occur to one skilled in the art that fairly fall within the basic teaching herein set forth.

For example, in the hardware such as a CPU, a ROM, and a RAM of the tactile presentation device 10, the information processing device 20, or the tactile pointer 60; a computer program can be created for implementing the functions of the tactile presentation device 10, the information processing device 20, or the tactile pointer 60. Moreover, a computer-readable memory medium having the computer program stored therein can also be provided.

The effects described in the present written description are only explanatory and exemplary, and are not limited in scope. That is, in addition to or in place of the effects described above, the technology disclosed in the application concerned enables achieving other effects that may occur to one skilled in the art.

Meanwhile, a configuration as explained below also falls within the technical scope of the application concerned.

(1)

An information processing device comprising:

a display control unit that displays information related to a tactile presentation device and displays a sensory position in the tactile presentation device as specified by a user; and a generating unit that, according to the sensory position and according to positions of a plurality of tactile stimulation units disposed in the tactile presentation device, generates an output control signal to be output to the plurality of tactile stimulation units, so that tactile stimulation is sensed at the sensory position.

(2)

The information processing device according to (1), wherein information related to the tactile presentation device represents information indicating positions of the plurality of tactile stimulation units in the tactile stimulation device.

(3)

The information processing device according to (1), wherein information related to the tactile presentation device represents information indicating outside shape of the tactile presentation device.

(4)

The information processing device according to any one of (1) to (3), wherein the generating unit generates the output control signal according to the sensory position and sensory intensity as specified by the user.

(5)

The information processing device according to any one of (1) to (4), wherein the generating unit generates the output control signal in such a way that tactile stimulation having type selected by the user is sensed at the sensory position.

(6)

The information processing device according to (5), wherein the display control unit displays a selection screen for enabling selection of a plurality of types of tactile stimulation.

(7)

The information processing device according to (5), wherein, according to the sensory position specified by the user, the display control unit displays a recommendation screen for recommending suitable type of tactile stimulation.

(8)

The information processing device according to any one of (1) to (7), wherein, the display control unit displays movement path of the sensory position.

(9)

The information processing device according to (8), wherein, the display control unit displays a video indicating movement of the sensory position and displays a seek bar for the video.

(10)

The information processing device according to (9), wherein, the display control unit also displays video content reproduced at time of presentation of tactile stimulation at the sensory position.

(11)

The information processing device according to (9) or (10), wherein, in accordance with reproduction of video indicating movement of the sensory position, the information processing device performs control to output the generated output control signal to the tactile presentation device.

(12)

The information processing device according to any one of (1) to (11), wherein, according to the sensory position specified by the user, the display control unit displays a recommendation screen in which positions of the plurality of tactile stimulation units are optimized.

(13)

The information processing device according to any one of (1) to (12), wherein, according to the sensory position specified by the user and according to positions of the plurality of tactile stimulation units, the display control unit displays a recommendation screen in which the sensory position is optimized.

(14)

The information processing device according to any one of (1) to (13), wherein, the sensory position and movement path of the sensory position are input using a controller that obtains three-dimensional position on a real object.

(15)

An information processing method implemented in a processor, comprising:

displaying
information related to a tactile presentation device, and
a sensory position in the tactile presentation device as specified by a user; and generating, according to the sensory position and according to positions of a plurality of tactile stimulation units disposed in the tactile presentation device, an output control signal to be output to the plurality of tactile stimulation units, so that tactile stimulation is sensed at the sensory position.

(16)

A program that causes a computer to function as:
a display control unit that displays information related to a tactile presentation device and displays a sensory position in the tactile presentation device as specified by a user; and
a generating unit that, according to the sensory position and according to positions of a plurality of tactile stimulation units disposed in the tactile presentation device, generates an output control signal to be output to the plurality of tactile stimulation units, so that tactile stimulation is sensed at the sensory position.

REFERENCE SIGNS LIST 10 tactile presentation device
100 tactile stimulation unit
102 sound output unit
110 control unit
120 communication unit
20 information processing device
200 control unit
201 sensory position/intensity deciding unit
202 screen generating unit
203 output control unit
210 communication unit
220 operation input unit
230 display unit
240 memory unit
60 tactile pointer
600 control unit
610 communication unit
620 operation input unit
630 sensor
640 display unit
650 tactile presentation unit
660 memory unit

The invention claimed is:

1. An information processing device comprising:
a display control unit configured to
display information related to a tactile presentation device, and
display a sensory position of tactile stimulation in the tactile presentation device as specified by a user; and
a generating unit configured to generate, according to the sensory position and according to positions of a plurality of tactile stimulation units disposed in the tactile presentation device, an output control signal to be output to the plurality of tactile stimulation units, so that the tactile stimulation is sensed at the sensory position,
wherein the displayed information related to the tactile presentation device represents a sensory intensity of the tactile stimulation sensed at the sensory position using a concentration of illumination of the displayed information to express the sensory intensity, and
wherein the display control unit and the generating unit are each implemented via at least one processor.

2. The information processing device according to claim 1, wherein the displayed information related to the tactile presentation device further represents information indicating positions of the plurality of tactile stimulation units in the tactile stimulation device.

3. The information processing device according to claim 1, wherein the displayed information related to the tactile presentation device further represents information indicating an outside shape of the tactile presentation device.

4. The information processing device according to claim 1, wherein the generating unit generates the output control signal according to the sensory position and the sensory intensity as specified by the user.

5. The information processing device according to claim 1, wherein the generating unit generates the output control signal in such a way that tactile stimulation having a type selected by the user is sensed at the sensory position.

6. The information processing device according to claim 5, wherein the display control unit is further configured to display a selection screen for enabling selection of a plurality of types of tactile stimulation.

7. The information processing device according to claim 5, wherein, according to the sensory position specified by the user, the display control unit is further configured to display a recommendation screen for recommending suitable type of tactile stimulation.

8. The information processing device according to claim 1, wherein, the display control unit is further configured to display at least one movement path of the sensory position.

9. The information processing device according to claim 8, wherein, the display control unit is further configured to
display a video indicating movement of the sensory position, and
display a seek bar for the video.

10. The information processing device according to claim 9, wherein the display control unit is further configured to display video content reproduced at a time of presentation of the tactile stimulation at the sensory position.

11. The information processing device according to claim 9, wherein, in accordance with reproduction of the video indicating the movement of the sensory position, the information processing device is further configured to perform control to output the generated output control signal to the tactile presentation device.

12. The information processing device according to claim 1, wherein, according to the sensory position specified by the user, the display control unit is further configured to display a recommendation screen in which positions of the plurality of tactile stimulation units are optimized.

13. The information processing device according to claim 1, wherein, according to the sensory position specified by the user and according to the positions of the plurality of tactile stimulation units, the display control unit is further configured to display a recommendation screen in which the sensory position is optimized.

14. The information processing device according to claim 1, wherein, the sensory position and a movement path of the sensory position are input using a controller that obtains at least one three-dimensional position on a real object.

15. The information processing device according to claim 1, wherein the displayed information related to the tactile presentation device further represents a range of the tactile stimulation using a width of the displayed information to express the range of the tactile stimulation.

16. An information processing method implemented in a processor, comprising:
   displaying information related to a tactile presentation device;
   displaying a sensory position of tactile stimulation in the tactile presentation device as specified by a user; and
   generating, according to the sensory position and according to positions of a plurality of tactile stimulation units disposed in the tactile presentation device, an output control signal to be output to the plurality of tactile stimulation units, so that the tactile stimulation is sensed at the sensory position,
   wherein the displayed information related to the tactile presentation device represents a sensory intensity of the tactile stimulation sensed at the sensory position using a concentration of illumination of the displayed information to express the sensory intensity.

17. A non-transitory computer-readable storage medium having embodied thereon a program, which when executed by a computer causes the computer to execute a method, the method comprising:
   displaying information related to a tactile presentation device;
   displaying a sensory position of tactile stimulation in the tactile presentation device as specified by a user; and
   generating, according to the sensory position and according to positions of a plurality of tactile stimulation units disposed in the tactile presentation device, an output control signal to be output to the plurality of tactile stimulation units, so that the tactile stimulation is sensed at the sensory position,
   wherein the displayed information related to the tactile presentation device represents a sensory intensity of the tactile stimulation sensed at the sensory position using a concentration of illumination of the displayed information to express the sensory intensity.

* * * * *